US012444200B2

(12) United States Patent
Fortune et al.

(10) Patent No.: US 12,444,200 B2
(45) Date of Patent: *Oct. 14, 2025

(54) SCANNERS TO CHARACTERIZE AND DISTINGUISH ANOMALIES BASED ON MULTIPLE MODE SCANS AND SCAN TIME THRESHOLDS

(71) Applicant: The Government of the United States of America, as represented by the Secretary of Homeland Security, Washington, DC (US)

(72) Inventors: John Fortune, Clifton, VA (US); Brian Lewis, Washington, DC (US); Michelle Weinberger, Fairfax City, VA (US)

(73) Assignee: The Government of the United States of America, represented by the Secretary of Homeland Security, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/979,033

(22) Filed: Dec. 12, 2024

(65) Prior Publication Data

US 2025/0111676 A1 Apr. 3, 2025

Related U.S. Application Data

(63) Continuation of application No. 17/353,320, filed on Jun. 21, 2021, now Pat. No. 12,183,081.
(Continued)

(51) Int. Cl.
*G06V 20/52* (2022.01)
*G01N 23/10* (2018.01)
(Continued)

(52) U.S. Cl.
CPC ............. *G06V 20/52* (2022.01); *G01N 23/10* (2013.01); *G06F 18/22* (2023.01); *G06F 18/251* (2023.01);
(Continued)

(58) Field of Classification Search
None
See application file for complete search history.

(56) References Cited

U.S. PATENT DOCUMENTS 7,689,455 B2 * 3/2010 Fligler ................... G06Q 30/02
705/7.38
10,366,293 B1 * 7/2019 Faviero ..................... G06N 3/08
(Continued)

FOREIGN PATENT DOCUMENTS

WO 2011020148 A1 2/2011

*Primary Examiner* — Delomia L Gilliard
(74) *Attorney, Agent, or Firm* — Kelly G. Hyndman; Robert W. Busby

(57) ABSTRACT

An example method to characterize an anomaly includes obtaining information about an item using a first mode scan and detecting whether the item contains an anomaly based on the information. The method further includes determining, responsive to detecting the anomaly, an area of interest of the item corresponding to a location of the anomaly, and determining a strategy including a procedure to obtain other information of the area of interest. The method refines a characterization of the anomaly based on the other information, and compares the characterization of the anomaly to a predetermined criterion. The method iteratively revises the strategy to perform additional available procedures, to further refine the characterization of the anomaly. When the characterization of the anomaly meets the predetermined criterion corresponding to a prohibited item, the method identifies the anomaly as prohibited.

28 Claims, 5 Drawing Sheets

Related U.S. Application Data

(60) Provisional application No. 63/144,334, filed on Feb. 1, 2021.

(51) Int. Cl.
  *G06F 18/22* (2023.01)
  *G06F 18/25* (2023.01)
  *G06T 7/30* (2017.01)
  *G06T 7/70* (2017.01)
  *G06V 10/25* (2022.01)

(52) U.S. Cl.
  CPC ............ *G06T 7/30* (2017.01); *G06T 7/70* (2017.01); *G06V 10/25* (2022.01); *G06T 2207/10116* (2013.01); *G06T 2207/30232* (2013.01)

(56) References Cited

U.S. PATENT DOCUMENTS

| | | | |
|---|---|---|---|
| 2002/0186862 A1* | 12/2002 | McClelland | H04L 67/02 382/100 |
| 2005/0036689 A1* | 2/2005 | Mahdavieh | G01V 5/20 382/199 |
| 2005/0258231 A1* | 11/2005 | Wiater | G06Q 10/087 340/5.1 |
| 2006/0002585 A1* | 1/2006 | Larson | G06T 7/0004 382/103 |
| 2006/0164285 A1* | 7/2006 | Fleisher | G01S 13/89 342/179 |
| 2008/0028464 A1* | 1/2008 | Bringle | G06F 21/33 713/189 |
| 2008/0056444 A1* | 3/2008 | Skatter | G01V 5/224 378/57 |
| 2008/0174401 A1* | 7/2008 | Reilly | G06F 18/251 340/5.2 |
| 2011/0206240 A1* | 8/2011 | Hong | G06F 18/2135 382/103 |
| 2013/0121529 A1* | 5/2013 | Fleisher | G01S 7/412 382/103 |
| 2015/0186732 A1* | 7/2015 | Perron | G06V 20/52 382/103 |
| 2017/0063890 A1* | 3/2017 | Muddu | G06F 3/04847 |
| 2017/0090062 A1* | 3/2017 | Cao | G01V 5/22 |
| 2017/0357857 A1* | 12/2017 | Perron | G01V 5/22 |
| 2018/0300557 A1* | 10/2018 | Rodenas | G08B 13/19613 |
| 2020/0184278 A1* | 6/2020 | Zadeh | G06N 3/044 |
| 2020/0193666 A1* | 6/2020 | Cinnamon | G06T 1/0007 |
| 2022/0245384 A1* | 8/2022 | Fortune | G06F 18/22 |

* cited by examiner

SCANNERS TO CHARACTERIZE AND DISTINGUISH ANOMALIES BASED ON MULTIPLE MODE SCANS AND SCAN TIME THRESHOLDS

CROSS-REFERENCE TO RELATED APPLICATIONS

This application is a continuation non-provisional application that claims the benefit of priority from U.S. patent application Ser. No. 17/353,320 entitled "SCANNERS TO CHARACTERIZE AND DISTINGUISH ANOMALIES BASED ON MULTIPLE MODE SCANS," filed on Jun. 21, 2021, which claims the benefit of priority from U.S. Provisional Application No. 63/144,334 entitled "SCANNERS TO CHARACTERIZE AND DISTINGUISH ANOMALIES BASED ON FIRST MODE SCANS AND SECOND MODE SCANS," filed on Feb. 1, 2021, the disclosures of which are incorporated by reference in their entireties.

STATEMENT OF GOVERNMENT INTEREST

This invention was made with U.S. Government support under contract No. 70RSAT19D00000003, Task Order No. 70RSAT20FR0000036, awarded by the United States Department of Homeland Security. The Government has certain rights in the invention.

FIELD

The discussion below relates generally to scanning items to promote and improve the efficiency of security.

BACKGROUND

Airports or other travel venues include checkpoints to screen baggage or other items to check for prohibited materials. Checkpoints may use scanning methods, (e.g., scanners) to perform security screening. Occasionally the scanners detect anomalies that the scanners cannot automatically classify as either prohibited items or permitted items. The anomalies require additional security procedures. For example, in order to resolve the anomaly, manual intervention by staff may be necessary, resulting in delays and increased staffing needs. Additionally, scanners can trigger false alarms, necessitating staff to subsequently resolve the alarms and confirm detected items are permitted items. False alarms decrease the overall efficiency of checkpoint operations.

SUMMARY

In one embodiment, a method to characterize an anomaly is disclosed. This method includes obtaining, by an emitter and a sensor of a scanner, information representing a first mode scan of an item and detecting whether the item contains an anomaly based on the information. The method further includes determining, responsive to detecting the anomaly, an area of interest of the item corresponding to a location of the anomaly. The method determines, based on the information, a strategy including a procedure to obtain other information of the area of interest. The method performs the procedure to refine a characterization of the anomaly based on the other information, and compares the characterization of the anomaly to a predetermined criterion. When the characterization of the anomaly does not meet the predetermined criterion and an additional procedure to refine the characterization of the anomaly is available, the method iteratively revises the strategy to perform the additional procedure and further refine the characterization of the anomaly. When the characterization of the anomaly does not meet the predetermined criterion and no additional procedures to refine the characterization of the anomaly are available, the method flags the item for manual screening. When the characterization of the anomaly meets the predetermined criterion corresponding to a prohibited item, the method identifies the anomaly as a security risk.

Another embodiment discloses a method to characterize an anomaly. This method includes obtaining, by an emitter and a sensor of a scanner, information representing a first mode scan of an item and detecting whether the item contains an anomaly based on the information representing the first mode scan. The method further includes determining an area of interest of the item corresponding to a location of the anomaly, responsive to detecting the anomaly, and determining a strategy to obtain other information relevant to characterizing the anomaly. The method further includes interposing, according to the strategy, at least one diffraction grating in a beam path of the scanner, and obtaining, by the emitter and the sensor of the scanner according to the strategy, other information representing a second mode scan of the area of interest while using the at least one diffraction grating. The second mode scan is a phase contrast scan. The method characterizes the anomaly based on the second mode scan, and differentiates whether the anomaly constitutes a security risk based on comparing an anomaly characteristic to a predetermined criterion.

In another embodiment, an apparatus is disclosed that includes a belt to convey an item to be scanned by a scanner, which is operable in a first mode and a second mode. The scanner operating in the first mode obtains information representing a first mode scan of the item to detect whether the item contains an anomaly, and determines an area of interest of the item corresponding to the anomaly. A controller of the scanner determines a strategy to obtain other information relevant to characterizing the anomaly. The scanner operates in the second mode according to the strategy to obtain, responsive to the anomaly being detected in the first mode scan, the other information representing a second mode scan of the area of interest of the item, to characterize the anomaly. The controller fuses the information with the other information to further characterize the anomaly and differentiate whether the anomaly constitutes a security risk based on a predetermined criterion.

In another embodiment, an apparatus is disclosed that includes a controller communicatively coupled to a first scanner and a second scanner. The controller causes an emitter and a sensor of the first scanner to obtain information by scanning a container that includes one or more items. The controller detects whether at least one of the items as an anomaly when it meets a predefined criterion based on the information. The controller determines, based on the information, a strategy to obtain other information relevant to characterizing the anomaly. The controller aligns another emitter and another sensor of the second scanner, according to the strategy based on at least part of the information, to direct a beam of energy to intercept the anomaly. The controller orients the second scanner with respect to the anomaly according to the strategy to minimize adverse impacts to the beam's properties. The controller obtains other information about the anomaly by detecting energy from the beam influenced by the anomaly, e.g., diffracted energy. The controller fuses the information and the other information to differentiate whether the anomaly constitutes a security risk based on a predetermined criterion.

In another embodiment, an apparatus is disclosed that includes a first scanner mounted to a gantry to obtain a first mode scan of an item. The first scanner includes an emitter and a sensor configured to enable the first scanner to collect energy and generate an electronic signal corresponding to information representing the first mode scan. The apparatus also includes a controller that detects, in the information representing the first mode scan, whether the item contains an anomaly, determines an area of interest of the item corresponding to a location of the anomaly, and determines, based on the first mode scan, a strategy to obtain other information relevant to characterizing the anomaly and representing a second mode scan of the area of interest. The apparatus includes a second scanner that is mounted to the gantry and configured to be operated by the controller according to the strategy to obtain the second mode scan of the area of interest under direction of the controller. The second scanner includes another emitter and another sensor configured to enable the second scanner to collect other energy and generate an other electronic signal corresponding to other information representing the second mode scan, responsive to the controller detecting the anomaly in the information representing the first mode scan. The controller characterizes the anomaly based on the other information from the second mode scan obtained according to the strategy and differentiates whether the anomaly constitutes a security risk based on comparing the other information to a predetermined criterion.

In other embodiments, the first mode scan utilizes a scan rate different from the second mode scan rate. For example, the first mode scan can involve the scanner operating at a relatively faster rate than the second mode scan, which may correspond to a relatively lower resolution than the second mode scan.

In other embodiments, the second mode scan utilizes different criterion than the first mode scan. For example, the first mode scan can is used to obtain a characterization of the anomaly and compare the characterization to a predetermined criterion corresponding to a first threat, such as a predefined set of values corresponding to a weapon. The second mode scan is used to obtain a characterization of the anomaly and compare the characterization to a predetermined criterion corresponding to a second threat, such as a predefined set of values corresponding to an explosive or other prohibited item.

Features and aspects of various embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

BRIEF DESCRIPTION OF THE DRAWINGS

The drawings and figures illustrate one or more implementations in accordance with the teachings of this disclosure. They are by way of example only, not by way of limitation. In the figures, like reference numbers refer to the same or similar elements. It will be understood that the drawings are not necessarily to scale.

DETAILED DESCRIPTION

Security screening efficiency is affected by various factors. While not exhaustive, factors include how frequently scanners generate false alarms or how often manual intervention by staff is required to resolve anomalies. Occasionally, a scanner's controller detects an anomaly associated with an item that has been scanned, triggering an alarm. In some situations, scanned items include security risk items, or items that adversely affect the ability of a scanner to identify potential security risk items. The nature of the item may not lend itself to being resolved easily by a scanner. Various embodiments described below achieve non-intrusive and time-efficient anomaly detection and characterization.

Figure 1:
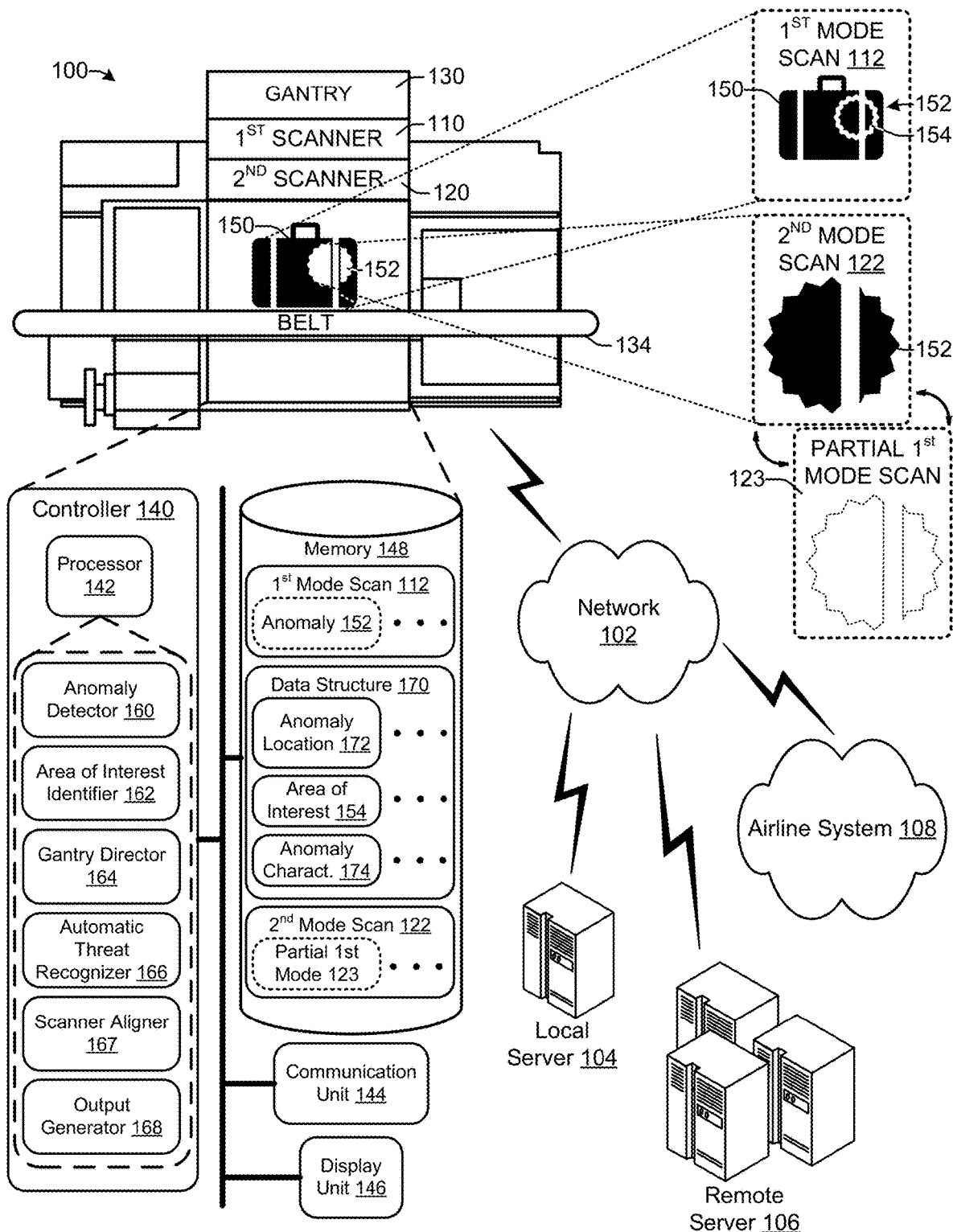
FIG. 1 is a depiction of an apparatus configured to obtain a first mode scan and a second mode scan according to an embodiment.

FIG. 1 is a depiction of an apparatus 100 configured to obtain a first mode scan 112 and a second mode scan 122 to identify an anomaly 152 according to an embodiment. As an overview, the apparatus 100 is illustrated in a side view, and includes a gantry 130, a first scanner 110, a second scanner 120, and a controller 140. The first scanner 110 is mounted to the gantry 130 and includes an emitter and a sensor (see FIG. 2). The emitter provides an X-ray source, and the detector physically detects X-ray energy from items undergoing scanning. The first scanner 110 is configured to obtain the first mode scan 112 of an item 150.

The controller 140 is an implementation of the processor 142, and the processor 142 provides the functionality of the controller 140. The controller 140 is coupled (e.g., via a bus) to memory 148, communication unit 144, and display unit 146, which support the controller 140. The controller 140 is configured to intake output of the sensor of the first scanner 110, and interpret the sensor output according to an algorithm (e.g., as implemented by anomaly detector 160) to identify whether there is an anomaly. An anomaly is an item or a part of an item that has a density associated with things that are security risks or otherwise prohibited, e.g., weapons or explosives. Permitted items can have a density generally similar to security risk items. Thus, the controller 140 is configured to use the second scanner 120 (e.g., to obtain other information such as from X-ray diffraction energy) to differentiate whether the identified anomaly is a security risk item. In an embodiment, one scanner may be used, and the controller 140 is configured to further analyze information from the first scanner 110, e.g., perform computationally expensive analysis of the information, to derive other information about the anomaly. In another such single-scanner embodiment, the controller 140 may direct the first scanner 110 to operate in another mode to obtain the other information about the anomaly. The controller 140 is depicted in FIG. 1 as part of a dual scanner apparatus 100 with a gantry 130. However, the controller 140, and its functionality described herein, may be used in other apparatuses, including those having a single scanner. Controller 140 may be included in an apparatus with no scanner, which is coupled to communicate with another scanner apparatus. For example, controller 140 may receive and process information from a separate scanner apparatus and send control commands to that separate scanner.

In some embodiments of this disclosure, the controller is configured to detect, in the first mode scan 112, whether the item 150 contains the anomaly 152. The controller 140 also is configured to determine an area of interest 154 of the item 150 corresponding to a location of the anomaly 152. The second scanner 120 is mounted to the gantry 130 and includes another emitter or emitters and another sensor or sensors (see FIG. 2). The second scanner 120 is configured to implement a second mode scan 122 of the area of interest 154 as directed by the controller 140. The second mode scan 122 can be performed according to various techniques (e.g., modalities). For example some embodiments may utilize varied scan rates, either varied between the two scan modes or variable within one of the scans, or implement criterion of a different type (e.g., orthogonal information or data analysis) compared to the first mode scan 112. The controller 140 can use the orthogonal information from the second mode scan 122 to discriminate between two items that appear similar in the first mode scan 112. For example, the first mode scan may obtain information from a non-risk food item (cheese) that appears indistinguishable from information from a security risk item (explosive). The second mode scan may obtain other information about the items, including other information that is orthogonal to the information from the first mode scan. It is possible that the other information from the second mode scan is at least partly not available within the information of the first mode scan (e.g., undetectable when performing the first mode scan). The second mode scan can be an X-ray diffraction pattern, which includes other information that is not available in the first mode scan, which can be a CT scan. Such other information from the second mode scan enables the controller to discriminate between, e.g., a security risk item (explosive), and a non-risk food item (cheese). The belt 134 selectively moves the item 150 through a beam path, or a plane encompassing the beam or beams, of the scanner or scanners. For example, controller 140 directs the belt 134 to move the item 150 through the gantry 130 to obtain the first mode scan 112 or the second mode scan 122. The controller 140 may be associated with a sub-controller, under control of the controller 140, which is configured to control positioning of the belt 134 or gantry 130. The controller 140 is configured to characterize the anomaly 152 and differentiate whether the anomaly 152 constitutes a security risk based on the second mode scan 122 of the area of interest 154. For example, the controller 140 evaluates an anomaly characteristic by comparing the anomaly characteristic against a predetermined criterion.

In other embodiments, a fixed gantry or gantries mounts the scanner (or scanners), or the scanners are integrated as part of the apparatus, without the use of gantries. For example, a first scanner may be stationary and configured to scan an entire container that includes one or more items. In an embodiment, the apparatus includes a belt or other actuator to move the item being scanned. For example, the belt moves the item to align a specific portion of the item to intersect a beam path or plane of the scanner or scanners. In another embodiment, the controller 140 directs a motor to pivot an emitter or sensor of the scanner to aim, e.g., align, the scanner to scan a specific portion of the item or container. Sensors of the scanners are configured to detect information that the controller can interpret as a potential anomaly or security risk.

In an embodiment, the controller identifies at least one of the items as an anomaly when it meets a predefined criterion based on the information. For example, the controller analyzes information from a first mode scan, and determines that the information is ambiguous or otherwise meets an anomaly criterion. For example, information in the first mode scan may seem to be consistent with (e.g., meet the criteria of) multiple items, such as non-risk items (e.g., food items) or security risk items (e.g., explosives). This ambiguity can be caused by the information available from the first mode scan, whose characteristics may limit the ability of the controller to distinguish some non-risk items from some security risk items. The first mode scan can be, e.g., a computed tomography (CT) X-ray scan. The controller attempts to resolve such ambiguity, by using other information from the second mode scan. The second mode scan can be, e.g., an X-ray diffraction scan. If still unresolved following the first mode scan and the second mode scan, the controller signals an operator that the controller cannot resolve the ambiguity. In another embodiment, the controller determines whether the information from the first mode scan or the other information from the second mode scan meets a criterion by applying one or more rules for a given criterion. A given rule, in turn, may be associated with one or more thresholds to be met to determine whether the information satisfies a given rule. The controller determines which of the rules are met, to within corresponding respective thresholds. Such predetermined criteria enable the controller to differentiate an ambiguity or an anomaly, and whether the anomaly is a potential security risk.

In an embodiment of this disclosure, the controller 140 is configured to analyze the first mode scan 112 and develop and implement a strategy to resolve the anomaly 152, e.g., an alarm resolution strategy. The controller 140 may analyze the information corresponding to the anomaly, which may include information in the area of interest or other areas surrounding the area of interest, or both, to develop and revise the strategy. The strategy may include one or more procedures or scan modes, and may involve the controller 140 iteratively adjusting how subsequent scans are performed. The controller 140 may perform such adjustments based on the information or the other information, based on availability of procedures for the controller 140 to use, or based on capabilities of equipment available to obtain and process the information or the other information.

The controller 140 may use various techniques to refine strategies or procedures for resolving anomalies, e.g., alarm resolution strategies. The controller 140 may adjust how subsequent scans are performed, e.g., by using one or more suitable scanner alignments when available, based on scanner capabilities and materials surrounding the area of interest that may negatively affect collection of the other information at the area of interest. The controller 140 may adjust a dwell time used when performing a given scan, integrate a weak signal over time to collect a measurement, adjust how much information is gathered during a given scan, repeat the given scan one or more times, or adjust an amount of energy of the given scan or the intensity of the given scan, to allow the given scan to integrate or obtain sufficient other information about the anomaly. In an example, such procedures may be used to compensate for materials that negatively affect information collection, independent of whether another scanner alignment is used to avoid the materials.

The controller 140 may select from among various different scanning technologies and use an available given scanning technology that the controller 140 deems suitable to obtain the other information. A procedure may involve a computationally intense analysis performed on existing information, whereby the procedure is performed to analyze such existing information without a need to obtain additional information or other information. In other embodiments, the system 100 may include technology to enable the controller 140 to adjust scan mode procedures based on parameters of the item 150, e.g., size, configuration, materials, and the like. Such procedures enable the controller 140 to refine characterizations of the item 150, the area of interest 154, or the anomaly 152. The controller 140 may use an arbitrary number of procedures or iterations available to refine a characterization of an anomaly, by performing additional follow-up procedures as needed, per determination by the controller 140 after performing a given procedure to learn more of the anomaly.

Embodiments may evaluate whether a candidate procedure is more likely than not to further refine the anomaly characterization by using various techniques. The controller 140 may evaluate whether the procedure is more likely than not to further refine the anomaly characterization based on various information, such as the existing scanning strategy, information the method already knows about the anomaly, or what additional information the method should seek for helping to further identify the anomaly. In an embodiment of the disclosure, the controller 140 may consider results of prior successful procedures. In an embodiment, a controller 140 accesses a library of anomalies and those respective procedures that successfully refined respective anomaly characterizations. Upon obtaining information about an anomaly, the controller compares that information to one or more previous scans and identifies a most similar previous scan. The controller accesses the library to determine the successful procedure associated with the most similar previous scan. The controller may revise a scanning strategy to adopt that successful procedure. That successful procedure has a likelihood to help refine the anomaly, due to the similarity between the information collected about the anomaly, and the information in the library corresponding to the most similar previous scan.

In another embodiment of the disclosure, the controller 140 identifies that the initial scan results correspond to a likely type of material, such as a likely explosive. By performing this type of preliminary identification and hypothesis formation, the controller 140 is able to diagnose a need for a specific type of follow-up scan to further evaluate the item and confirm or disprove the hypothesis. In this example of an explosive diagnosis, the controller 140 identifies (e.g., via a lookup table) that the diagnosed explosive is associated with a high vapor pressure, which causes the diagnosed explosive to emit vapor in a way that can be collected and tested by a procedure available in the scanner managed by the controller 140. The controller 140 then performs a vapor collection test and confirms that the hypothesis is valid, without needing to perform other additional tests. Furthermore, the controller 140 is able to selectively deploy such vapor collection tests when deemed useful following the initial scan, without wasting time applying the test blindly to every item. The controller 140 may similarly selectively deploy and orchestrate various types of scan tools and procedures consistent with specific strategies to resolve anomalies, corresponding to various types of prohibited items or permitted items. Such scan tools and procedures include optical trace explosive detection, vapor measurement, diffraction X-ray, phase contrast X-ray, physical inspection, and so on. The controller 140 may obtain results of one procedure that preclude the need for obtaining results from another procedure, thereby efficiently deploying the various procedures optimally.

Multiple scan results for a given item may be fused together to generate fused scan results. In an embodiment, fused scan results are represented by voxels. Each such voxel corresponds to an n-dimensional cube of information collected from the multiple scan results, the multiple scan results providing various kinds of information refining the anomaly characterization as represented in the fused scan results.

In an embodiment, the controller 140 uses the following approach. The controller 140 collects a first mode scan, and identifies the anomaly, e.g., the object of concern in the first mode scan. The controller 140 extracts relevant information that the controller 140 gleans from the first mode scan about the anomaly, as well as what the controller 140 gleans from the materials and objects around the anomaly. The controller 140 determines how the materials and objects around the anomaly might impact the effectiveness of the various follow-up scan tools, techniques, or procedures. The controller 140 compares the potential effectiveness of the follow-up scans, and develops a scanning strategy based on the viability of the various scans, strategizing in view of the available toolset of different scan technology and different ways of using them. The controller 140 may use various approaches for making such determinations, such as by using assessment algorithms, machine learning, comparisons with similar scan scenarios from the past, decision trees, artificial intelligence, and the like. The controller 140 implements the determined scanning strategy to obtain subsequent scan information (other information) and may accumulate or fuse the various scan information together. The controller 140 may iterate through multiple scanning tools or procedures, and revise or refine the scanning strategy or chosen procedure between each application of a given scanning tool or procedure. The controller 140 may simultaneously deploy multiple scanning tools to collect multiple instances of corresponding scan information. The controller 140 may deploy all relevant scanning tools it deems helpful in resolving whether the anomaly pertains to a permitted or prohibited item, e.g., to resolve the anomaly to within an acceptable threshold to a criterion. The controller 140 may iterate such approaches until exhausting available relevant strategies, or until resolving the anomalous condition or alarm condition for the item. Thus, the controller 140 may perform an initial scan by default and develop a subsequent scanning strategy based on the initial default scan, and iterate until the anomaly is resolved or the scanning procedures are exhausted and the item is flagged for manual review.

The controller 140 may determine that the anomaly cannot be resolved automatically, or cannot be resolved within a reasonable time period, and flag the item for manual review regardless of whether additional procedures are available. The controller 140 may determine such a reasonable time period based on predetermined desired scan times, or other factors. The controller 140 is configured to determine what procedure or procedures are most likely to accurately identify whether or not an anomaly poses a security risk (e.g., an item that is either prohibited or permitted). In an example scenario, the controller 140 reviews a first mode scan and determines that the item is too anomalous for further resolution. The controller 140 then immediately flags the item for manual review, saving time by not performing additional follow-up scans that ultimately may be inconclusive.

The controller 140 may determine how to refine strategies or procedures, based on machine learning or artificial intelligence. For example, the controller 140 may analyze previous scanning results and determine their potential similarity or applicability to a current scanning scenario. In an embodiment, the controller 140 compares the information from a given scan to one or more previous scans. The controller 140 may perform the comparison between scans or scan information by using various approaches such as artificial intelligence, machine learning, fuzzy logic, heuristics, or other approaches. The previous scans are associated with previous successful procedures, which previously enabled the controller 140 to successfully identify an anomaly in a given situation. For example, the controller 140 may have encountered an anomaly surrounded by a metal enclosure, and determined that a given amount of scan energy was sufficient to gather information the controller 140 used to further refine a characterization of the anomaly and resolve whether the anomaly is a prohibited or permitted item. The controller 140 then may identify similar metal enclosures in future scans and retrieve corresponding stored scan settings that the controller 140 uses to set an appropriate scanning energy in future scans. Such settings enable the given scan to penetrate the metal enclosure and characterize the anomaly within. Thus, the controller 140 identifies a most similar previous scan, associated with a most similar previous successful procedure, from among one or more previous scans. When such a previous successful procedure is available for the controller 140 to deploy, the controller 140 revises the scanning strategy to adopt the most similar previous successful procedure. Such an approach enables the controller 140 to refine the characterization of the anomaly. Such previous successful procedures may be deployed iteratively, and the controller 140 may identify a previous successful iterative approach to resolving an anomaly.

The controller can read the outputs of sensors, e.g., analyze the information from the first mode scan, and the other information from the second mode scan. The controller can plot the values of the information and other information as datapoints, e.g., in three-dimensional (x, y, z) space, and apply an algorithm to determine which of the datapoints meet the criterion (e.g., meet a density associated with an explosive material). If sufficient datapoints of the material are found, corresponding to a threshold amount, the controller identifies the datapoints as an anomaly or potential security risk.

In an embodiment of this disclosure, the controller uses a fused scan and a criterion to determine whether an anomaly constitutes a security risk. For example, the controller fuses the first mode scan with the second mode scan and compares the fused scan against the criterion. In another embodiment, the controller iteratively refines a characterization of the item, based on fusing or obtaining and combining information from multiple additional scans, modes, or further analyses of information. Such approaches may be used to create a fused scan, which may be based on many different sources of obtaining information. In an embodiment, the controller performs automatic threat recognition (e.g., via an automatic threat recognizer) as described in further detail below, and with reference to FIGS. 4 and 5.

The controller is configured to obtain different, or other, information about the anomaly, e.g., by using the second scanner in those embodiments with multiple scanners. In an embodiment, the controller is configured to obtain additional information, such as a second mode scan, by directing a given scanner (or the single scanner, in those embodiments using a single scanner) to operate in a different manner, e.g., using a longer dwell time, increased scanning energy intensity, or the like. In an embodiment, the controller aligns the second scanner or the given scanner to focus on the anomaly, based on at least part of the information. In an embodiment, the controller determines such alignment by developing a resolution strategy, to enable the scanner to direct a beam of energy to intercept the anomaly. In another embodiment, the controller determines such alignment to orient the scanner with respect to the anomaly to avoid other items. More specifically, the controller is configured to develop the resolution strategy by analyzing the information from the first scan, e.g., to determine that the baggage contains items associated with a characteristic that adversely impacts the beam's properties. For example, the controller identifies, in the information from the first scan, metal artifacting corresponding to a metal item which the controller identifies as adverse. The controller is also configured to determine an alignment of the beam path through the baggage that minimizes intersections with such adverse items, or that allows the beam to entirely avoid such adverse items (when applicable for a given geometrical layout of adverse items). For example, the controller determines from the first mode scan that a given item can be scanned using a vertical alignment or a horizontal alignment of the scanner in the second mode scan. The controller also determines that an adverse item is located vertically above the given item to be evaluated. The controller therefore determines to scan the given item using a horizontal alignment, avoiding the adverse effects of the adverse item. Such alignment enables the second scanner to obtain useful other information, while avoiding degradation of the other information that would otherwise be caused by the beam intersecting adverse items. The controller can use a similar approach for selecting an alignment from among many possibilities (not limited to vertical or horizontal alignments). For example, the controller can use a mathematical equation (e.g., a minimizing function) to analyze multiple candidate paths through a cross-section of the item, to select the path associated with the least adverse effect.

In another embodiment, the controller is configured to obtain multiple second mode scans, to collect other information about the anomaly and minimize the effect of adverse items. A given item may be scannable with unavoidable effects from an adverse item, e.g., when the given item is contained within a metal container, such as a bowl. The controller detects the metal container as an adverse item in the first scan and determines a strategy to obtain two second mode scans to address the adverse item. The controller may obtain one second mode scan using a top-down X-ray scan, and another second mode scan using a bottom-up X-ray scan. The top-down X-ray scan involves collecting information from the beam passing through the metal and then through the anomaly. The bottom-up X-ray scan involves collecting information from the beam passing through the anomaly and then the metal. The controller then performs a mathematical operation (e.g., a delta operation) to determine what information contribution comes from the anomaly, and to determine what information contribution comes from the metal adverse item. The controller then can better distinguish the anomaly information. In another embodiment, the controller obtains the multiple second mode scans via back projections. The controller determines differences between the back projections to extract information regarding what materials the beam passed through (e.g., whether anomaly items or adverse items). The beam, e.g., as emitted by the second scanner (or by a single scanner operated according to a second mode), is used to obtain other information about the anomaly.

The controller obtains other information about the anomaly, by detecting energy from the beam from the second scanner (or scanner operating according to a second mode) that passed through the anomaly. The beam is specifically aligned to avoid or minimize exposure to adverse items, while still passing through the anomaly. Such alignment is enabled by the use of a first scan to assess the items being scanned, to determine potential anomalous or adverse items (e.g., to avoid or minimize metal artifacting or other image cluttering). After obtaining the information from the first scan, and the other information from the second scan, the controller fuses the information and other information. The controller analyzes the fused information to determine whether the anomaly constitutes a security risk. For example, the controller compares aspects of the fused information to a predetermined criterion that indicates a weapon security risk.

In another embodiment, the controller iteratively develops and performs a scanning strategy to determine whether the anomaly constitutes a security risk. Such a controller can deploy scanning tools or procedures while repeatedly refining the scanning strategy, until the anomaly is resolved or deemed unresolvable. In an embodiment, the controller deems an anomaly unresolvable when relevant scanning procedures are exhausted, but a characterization of the anomaly does not match a criterion for a permitted item or prohibited item. The controller determines whether a scanning procedure is relevant based on whether the scanning procedure will further characterize the anomaly or refine the anomaly characterization in a manner that moves the anomaly characterization closer to a known criterion for a permitted item or prohibited item. As described above, the controller identifies the anomaly in the first mode scan, along with relevant information about the anomaly and materials and objects around the anomaly. The controller 140 determines a strategy to maximize the effectiveness of follow-up scans, in view of the available toolset of different scan technology to refine a characterization of the anomaly. The controller 140 may iteratively revise or refine the scanning strategy, applying the scanning procedures as needed to resolve whether the anomaly pertains to a permitted or prohibited item.

As illustrated in FIG. 1, the controller 140 includes one or more processors 142, and is in electronic communication (e.g., via a bus) with one or more communication units 144, display units 146, and memories 148. The communication unit 144 is representative of one or more devices adapted to electronically communicate information to and from other devices and components, including in instances those included in or external to the system. Example communication units include but are not limited to wireless devices (such as an 802.11 compliant unit), wired devices based on Ethernet or other such communication interfaces, near field communication (NFC) transceivers, or a cellular communication transceiver. Example 802.11 compliant modems or cards include but are not limited to those compliant with 802.11n, 802.11ac, 802.11ad, 802.11ah, 802.11aj, 802.11ax, and the like wireless local area network standards promulgated by the Institute of Electrical and Electronics Engineers (IEEE), New York, New York. As will be appreciated, the communication units 144 can be used in a variety of combinations and arrangements based on operational parameters and design preference, to communicate with system components and resources (e.g., third-party computing resources) external to the apparatus 100. In embodiments, communication unit 144 includes a combination of hardware and software. The processor 142 supports the communication unit 144 in the illustrated embodiment. In other instances, a dedicated processor is included in or with the hardware that forms the communication unit 144.

Although a single processor 142 and memory 148 are illustrated, other embodiments are constructed with multiple processors 142 and memories 148 based on design preference. The processor 142 is representative of hardware configured to process computer executable instructions, such as a central processing unit that executes a program of instructions. In embodiments, the processor 142 implements an operating system which is a set of computer executable instructions that allows the processor 142 to perform specialized instructions according to a program run on the operating system and processor platform as described consistent with this disclosure.

Memory 148 is representative of a wide variety and types and combinations of memory suitable for storing information in an electronic format. Example memory includes, but is not limited to, random access memory (RAM), hard disk memory, removable medium memory, flash storage memory, and other types of computer-readable media including non-transitory data storage. For example, local memory 148 stores a variety of information obtained from the first scanner 110, the second scanner 120, the network 102, and so forth. Although memory 148 is illustrated as within the controller 140, in some instances memory includes an array of memory devices, such as a RAID configuration.

The controller 140 is illustrated including various modules (e.g., anomaly detector 160, area of interest identifier 162, etc.), that are representative of hardware or software, that are constructed to provide the described capabilities, such as through execution of a program of instructions that, when implemented by hardware, function in the described manner. In embodiments, modules are logical combinations of hardware and software designed to electronically perform the described functions and support objects (instances), such as through operation of instructions that cause the hardware to provide the described functions. In embodiments, the individual modules interact through one or more application program interfaces (APIs) that permit interaction and passing of information between the hardware and software forming a particular module with that of other modules and data structures, e.g., databases. In some instances, the modules or subgroups of modules are integrated into a unitary program of instructions based on design preference. The software can be embodied as a program of instructions stored in memory (e.g., non-transitory memory) that are accessible to the processor at runtime, or execution. In instances, hardware supporting the modules includes an operating system, which can be stored in memory 148, on which the described modules function.

Referring back to the controller 140, the included processor 142 is associated with modules labeled as anomaly detector 160, area of interest identifier 162, gantry director 164, automatic threat recognizer 166, scanner aligner 167, and output generator 168. The memory 148 is associated with structures including the first mode scan 112 (including detected anomaly 152), data structure 170, and second mode scan 122 (including partial first mode scan 123). The data structure 170 includes anomaly location 172, area of interest 154, and anomaly characteristic 174. The functionality of such modules and structures is described in further detail below. While shown and described as individual modules and structures, the supporting hardware or software can be configured as an integrated program of instructions to provide the described functionality, such as through the use of application program interfaces (APIs) that permit individual programs to interact, such as by passing information to one or more other programs and providing one or more graphical user interfaces (GUIs) output on a display.

The apparatus 100 is communicatively coupled to the network 102, e.g., via communication unit 144 of the controller 140. The controller 140 is configured to communicate via the network 102 with other systems, including one or more of the illustrated local server 104, remote server 106, airline system 108, and other systems.

Referring back to apparatus 100, in an embodiment, the first scanner 110 enables the apparatus 100 to perform scanning according to a fast sensing mode, to obtain the first mode scan 112 of the entire item 150 at a rate relatively quicker than a rate of the second scanner 120. The second scanner 120 enables the apparatus 100 to perform scanning according to a relatively more detailed, slower, and more time-consuming sensing mode, to obtain a highly detailed second mode scan 122. As illustrated in FIG. 1, two scanning modalities are provided by the first scanner 110 and the second scanner 120. In other embodiments, a single scanner provides multiple scanning modalities, e.g., by reconfiguring or adjusting operation of the single scanner to obtain the first mode scan 112 and the second mode scan 122 (and additional mode scans, as appropriate). The controller 140 may use one scanner iteratively, by directing the scanner to obtain information suitable to refine a characterization of the anomaly, then obtaining additional scan or scans in view of the information already obtained. The controller 140 also may perform more detailed analysis of information already obtained, such as by applying a computationally expensive algorithm to a subset of previously obtained information. The controller 140 thereby derives additional characteristics of the anomaly by further analyzing that subset of the information. This improves efficiency. The controller 140 determines it is unnecessary to apply the algorithm to other sections of the information because it would not yield further useful information to refine the anomaly characterization or the subsequent scanning strategy.

The controller 140 of the apparatus 100 directs the second scanner 120, if needed, in a different manner, such as a relatively more focused or exclusive manner, as compared to how the controller 140 directs the first scanner 110 to operate. Similarly, the controller 140 may direct a given scanner to obtain a first mode scan 112 using a default quick mode, and direct that same given scanner to operate in a different, more time-consuming manner to obtain the second mode scan 122. For example, such an approach may be used in a single-scanner apparatus, to obtain a first mode scan 112 and a second mode scan 122 using one scanner. Accordingly, the apparatus 100 obtains the second mode scan 122 selectively, to conserve resources expended in obtaining the second mode scan 122. Embodiments also enable efficient overall operations, by determining whether the second mode scan 122 is needed, based on the first mode scan 112. Similarly, the controller 140 may iteratively use the scanner or scanners, and corresponding procedures to obtain additional information that contributes toward further refinement of a characterization of the anomaly. The controller 140 may decide not to obtain one type of scan but not another type of scan of the item, based on results from the scan or scans already performed on the item. The controller 140 may selectively deploy an arbitrary number of such procedures as part of an overall strategy to iteratively resolve an anomaly. An embodiment determines that the first mode scan 112 does not indicate an anomaly, and therefore does not expend time or resources to perform the second mode scan 122. As illustrated, the second mode scan 122, when performed, covers the area of interest 154 corresponding to the anomaly 152.

The controller 140 is configured to perform anomaly detection (via anomaly detector 160) on the first mode scan 112 to detect the anomaly 152. The controller 140 also is configured to perform automatic threat recognition (via automatic threat recognizer 166) on the second mode scan 122, or any number of subsequent scans, to identify at least one anomaly characteristic 174 of the anomaly 152. The anomaly characteristics 174 may not be available from the first mode scan 112, or otherwise may be based on other information of the second mode scan 122 that is orthogonal to information of the first mode scan 112. Accordingly, the anomaly characteristics 174 provide additional insight into aspects of the anomaly 152 that may not be capable of being inferred from the first mode scan 112 alone.

The illustrated embodiment of FIG. 1 makes use of a gantry 130 to support the first scanner 110 and the second scanner 120. The gantry 130 facilitates coordination of scanning by providing a shared physical platform from which to register, calibrate, or aim the first scanner 110 and the second scanner 120 relative to each other, relative to the gantry 130, or relative to the item 150. The relative positioning between the scanners and the item 150 also is controlled via positioning of the belt 134 under direction of the controller 140. In other embodiments, the scanner or scanners are integrated into the apparatus 100 without use of a gantry, such that the system or apparatus serves as the physical platform for orienting the scanners relative to each other.

Mounting the first scanner 110 and the second scanner 120 on the same gantry 130 maintains registrations of the relative scanner locations and orientations. For example, using the same gantry to mount both scanners enables the controller 140 to automatically use scan information from the first scanner 110, and known orientation of the first scanner 110 relative to the gantry 130, to then target or aim the second scanner 120. Thus, the controller 140 is capable of aiming the second scanner 120 based on known orientation of the second scanner 120 relative to the gantry 130. In an embodiment, the gantry 130 is configured to rotate, to reorient the first scanner 110 and the second scanner 120 relative to the item 150. In another embodiment, the gantry 130 is stationary and the first scanner 110 or second scanner 120 are movable relative to the gantry 130. Embodiments also include the combination of a movable gantry 130 and movable first scanner 110 and second scanner 120, e.g., to aim the first scanner 110 and second scanner 120 relative to the gantry 130 and each other.

The example apparatus 100 makes use of the gantry 130 to achieve various adjustments when operating the first scanner 110 and the second scanner 120 mounted to the gantry 130. For example, the controller 140 is configured to direct the gantry 130 to selectively rotate, thereby rotating the first scanner 110 at a first revolutions per minute (RPM) to obtain the first mode scan 112. The controller 140 also is configured to rotate the second scanner 120 at a second RPM lower than the first RPM, to obtain the second mode scan 122. Such rotational operations are consistent with computed tomography (CT) scanners serving as the first scanner 110 and the second scanner 120. Such CT scanners rotate around the item 150 to obtain raw data (sonograms) interpreted by the controller 140 via tomographic reconstruction (e.g., performing reconstruction, segmentation, and the like), to obtain a series of cross-sectional scans of the item 150. Different rotational speeds are appropriate for different CT scanning approaches, e.g., using a faster gantry rotation speed for a quick scan at lower resolution or detail, and using a slower gantry rotation speed for a highly-detailed more focused scan. In other embodiments, the gantry 130 is used to position a scanner within range of the item or area of interest 154, to perform scanning according to an approach different than CT. Such different approaches include planar imaging or other corresponding types of stationary emitter and sensor systems (e.g., X-ray diffraction scanning). In other embodiments, the gantries are non-rotating, to support and move the scanners as needed to obtain the first and second scans. In yet other embodiments, the scanners are actuatable to align the scanners relative to the system platform, and integrated into the system platform without the use of gantries to support the scanners.

Embodiments combine different scanning approaches, such as CT scanning via the first scanner 110, and stationary scanning via the second scanner 120. Accordingly, embodiments also include the controller 140 configured to direct the gantry 130 to rotate the first scanner 110 through a plurality of revolutions to obtain the first mode scan 112 (e.g., CT scanning), and rotate the second scanner 120 through less than one revolution to obtain the second mode scan 122. In an embodiment, the controller 140 rotates the gantry 130 to orient the second scanner 120 into a suitable position or alignment, then directs the gantry 130 to remain fixed to obtain a stationary or planar imaging scan. In another embodiment, the second scanner 120 is actuatable without the use of a gantry, to align its beam to scan the anomaly while avoiding adverse items.

Another embodiment is disclosed wherein the controller 140 directs the gantry 130 to rotate. This enables the first scanner 110 to perform computed tomography (CT) scanning using transmission X-ray. Thus, the gantry 130 is directed by gantry director 164 to rotate around the item 150 to obtain the first mode scan 112. In the embodiment, the controller 140 directs the anomaly detector 160 to detect the anomaly 152 based on the first mode scan 112. The controller 140 then directs the gantry 130 or second scanner 120 to obtain a relatively more time-consuming and detailed scan, of a portion of the item 150, e.g., the area of interest 154 corresponding to the anomaly 152. Accordingly, the apparatus 100 obtains additional information about the anomaly 152. For example, the apparatus 100 obtains additional information about the area of interest 154 that is not easily discernable after the first mode scan 112. The apparatus 100 does not need to spend the time obtaining a second mode scan 122 of the entire item 150. Rather, the apparatus 100 focuses the time-consuming detailed second mode scan 122 on the portion of the item 150 that generated the anomaly alert or anomaly detection in the first mode scan 112.

Regarding example scanning approaches used in the described embodiments, the controller 140 directs the first scanner 110 to perform a first pass of the entire item 150 using a relatively faster scanning approach to obtain the first mode scan 112. If the relatively faster first mode scan 112 turns up one or more anomalies 152, the controller 140 identifies which portion or portions of the item 150 correspond to the anomaly 152 (e.g., one or more tomographic image slices of the item 150). The controller 140 configures the apparatus 100 (e.g., the gantry 130 or the second scanner 120) to scan that portion of the item 150 (e.g., the area of interest 154) using a relatively more in-depth scanning (or a different type of scanning), to obtain the second mode scan 122. In another embodiment, operation of the second scanner 120 involves slowing or stopping rotation of the gantry 130 or providing relatively more dwell time for the second scanner 120 to gather sufficient or additional scan information consistent with performing the second mode scan 122. The controller 140 also is configured to adjust a power level of a given first scanner 110 or second scanner 120, to enable the scanner to operate according to a different mode, e.g., to obtain the relatively more detailed scan information (compared to the first mode scan 112) consistent with performing the second mode scan 122. Such approaches enable the controller 140 to operate either of the first scanner 110 or the second scanner 120 according to more than two modes. The embodiment of FIG. 1 illustrates a single gantry. In other embodiments, a first gantry and a second gantry are used to mount the first scanner 110 and the second scanner 120, respectively. Other embodiments utilize different scanning technologies at gantry 130, such as phase contrast imaging, diffraction X-ray, optical trace detection systems, and so on. Such scanning technologies can be integrated with the embodiments disclosed herein, whether mounted to a movable gantry, a stationary gantry, or otherwise incorporated into the described systems.

Figure 2:
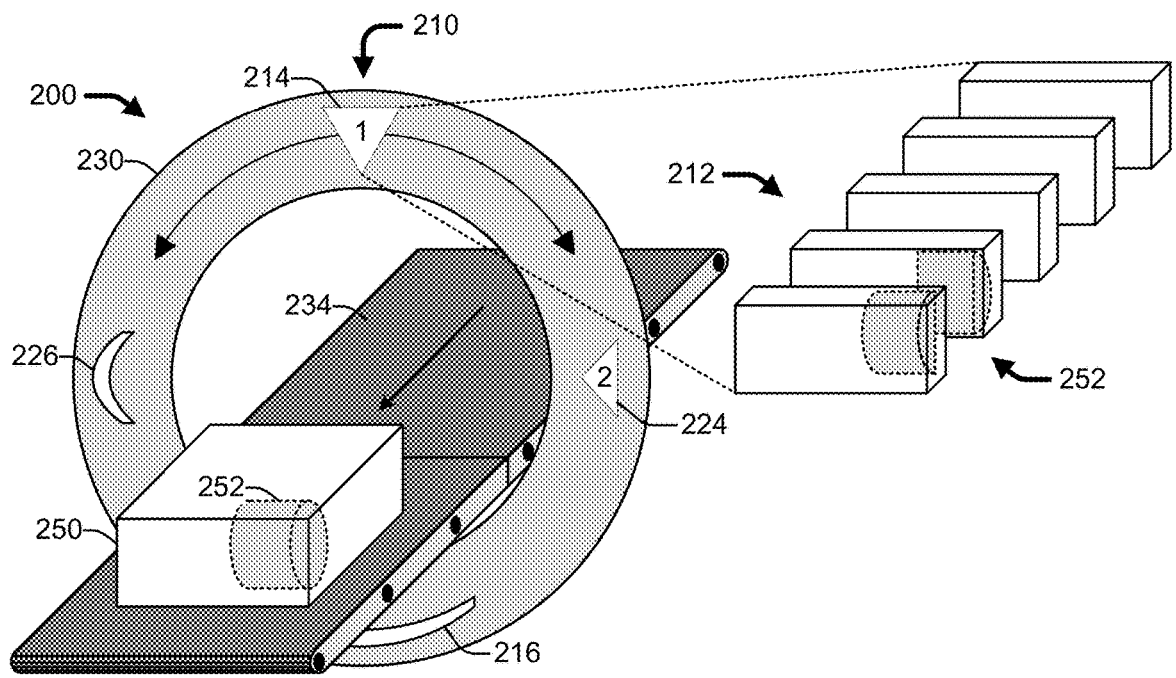
FIG. 2 is a depiction of an apparatus including a first scanner obtaining a first mode scan according to an embodiment.

Turning to scanner operation in greater detail, various components of the apparatus 100 enable the first scanner 110 to obtain the first mode scan 112, such as an emitter, a sensor, and the like (see FIG. 2 for more details). In the illustrated embodiment of FIG. 1, the controller 140, including its various modules and structures, directs the first scanner 110 to obtain the first mode scan 112 (but not to obtain the second mode scan 122). Similarly, the controller 140 directs the second scanner 120 to obtain the second mode scan 122 (but not to obtain the first mode scan 112). However, in other embodiments, the first scanner 110 or the second scanner 120 are configured to operate according to multiple modes to obtain the first mode scan 112 or the second mode scan 122. In an embodiment, after the first scanner 110 obtains the first mode scan 112, the controller 140 directs the apparatus 100 to interpose a diffraction grating (e.g., see diffraction grating 227 illustrated in FIG. 3) into a beam path between an emitter and sensor of the first scanner 110. The configurable aspect of the first scanner 110 enables it also to operate in a second mode, to obtain the second mode scan 122. A similar configurable mode change for the first scanner 110 or the second scanner 120 also enables use of a phase contrast scan. The phase contrast scan involves selectively interposing a phase contrast filter into the scanner beam path to change modes of the scanner. As an alternative or in addition to the use of filters, the scanners are also configurable based on other technical implementations. For example, in another embodiment, the first scanner 110 includes multiple sensors corresponding to obtaining the first mode scan 112 and the second mode scan 122, e.g., by reorienting an aim of an emitter of the first scanner 110 to cause the beam path to selectively fall on a given one or more of the multiple sensors, according to scanner mode.

The second scanner 120, similar to the first scanner 110, includes various components to obtain the second mode scan 122, such as an emitter, a sensor, and the like (see FIG. 2 for more details). In this embodiment, the second scanner 120 is configured to obtain the second mode scan 122, but not the first mode scan 112. However, in other embodiments, the second scanner 120 is configured to operate according to multiple modes to obtain the first mode scan 112 and the second mode scan 122. Embodiments described herein include various implementations, whether using one or more scanners such as first scanner 110 and second scanner 120, to obtain the first mode scan 112 and the second mode scan 122. In an embodiment, the first scanner 110 is a transmission X-ray scanner to obtain a quick first mode scan 112 of the entire item 150 based on X-ray computed tomography. In the embodiment, the second scanner 120 is a phase contrast interference imaging scanner or an X-ray diffraction scanner, operated relatively more slowly to obtain second mode scan 122 of the area of interest 154 of the item 150. The technique or technology used by the second scanner 120 enables the second mode scan 122 to be based on scan information that is not available in the first mode scan 112.

In another embodiment, the second mode scan 122 includes information indicative of at least one characteristic that is undetected by the first mode scan 112. For example, the apparatus 100 activates a first scan mode and a second scan mode, based on technologies that generate information, from the first mode scan 112, that is of a type orthogonal to other information from the second mode scan 122. This enables the second mode scan 122 to reveal characteristics about anomaly 152, or the item 150, that are less likely revealed by the first mode scan 112.

In some embodiments, the technique or technology used by the second scanner 120 enables the second scanner 120 to also obtain the same type of information that was obtained by the first mode scan 112. For example, information obtained during operation of the second scanner 120 (to obtain the second mode scan 122) is of the same type as information obtained during operation of the first scanner 110. Thus, such embodiments of the second mode scan 122 also collect a version or subset of the first mode information. Such version or subset of the first mode information can be collected by the second mode scan 122, and can be collected along with the second mode information. Such second mode information may be of a nature that is not available or contained in the first mode scan 112 (depending on the respective scanner technologies used). Because the version or subset of such first mode information is obtained substantially simultaneously during the second mode scan 122, such subset of first mode information pertains to that portion of the item 150 undergoing the second mode scan, e.g., the area of interest 154. Such subset of first mode information is referred to herein as a partial first mode scan 123.

By way of example, the first mode scan 112 is obtained via transmissive X-ray, and the second mode scan 122 is obtained via X-ray diffraction pattern or phase contrast imaging. X-ray diffraction and phase contrast imaging obtain scan information that is orthogonal to the transmissive X-ray information. However, gathering scan information via X-ray diffraction or phase contrast imaging also results in the gathering of transmissive X-ray information, for the portion of the item undergoing scanning. Such information, referred to as partial first mode scan 123, is useful in coordinating operations of the first scanner 110 and the second scanner 120. For example, the partial first mode scan 123 is used by the controller 140 to align the first scanner 110 and the second scanner 120 relative to each other, or the gantry 130, to ensure they are capable of imaging the same location accurately and precisely, as described below. Furthermore, the partial first mode scan 123 can be used by the controller 140 to generate alerts or otherwise detect issues with scans or the scanning process.

The controller 140 coordinates operation of the first scanner 110 and the second scanner 120, e.g., via scanner aligner 167. Such coordination enables the first scanner 110 to accurately and precisely aim at the location of the area of interest 154, while ensuring that the second scanner 120 is similarly capable of aiming at the location of interest 154. The coordination also enables the second scanner 120 to obtain the second mode scan 122 of the area of interest 154, without including extraneous portions of the item 150 unrelated to identifying the anomaly 152. In an example alignment, scanner aligner 167 of the controller 140 registers the orientation or aim of the first scanner 110 and the second scanner 120 relative to each other, the apparatus, or the gantry 130, e.g., via a calibration routine. The scanner aligner 167 also compares information obtained by the first scanner 110 to information obtained by the second scanner 120. Such comparison enables the scanner aligner 167 to determine whether the first scanner 110 and the second scanner 120 are mechanically aimed where expected, and enables the first scanner 110 and the second scanner 120 to scan the same area of interest 154 of the item 150.

If the controller 140 detects that the first scanner 110 or the second scanner 120 has become misaligned, the scanner aligner 167 performs a calibration routine to co-register the first scanner 110 and the second scanner 120. The calibration routine accommodates offsets in alignment between the first scanner 110, the second scanner 120, or the gantry 130. An embodiment regularly performs such calibration routine by physically targeting and obtaining a first mode scan 112 and a second mode scan 122 of a known reference location, then performing image registration between the first mode scan 112 and the second mode scan 122. Image registration enables the calibration routine to compensate the physical targeting of the first scanner 110 or the second scanner 120 to accommodate any offset. The controller 140 similarly uses location information (e.g., anomaly location 172) or the area of interest 154 (as determined by the controller 140 based on the first mode scan 112) as a reference location. Such reference location enables the controller 140 to direct the second scanner 120 to focus on the area of interest 154, such that the second mode scan 122 corresponds to the area of interest 154 of the item 150. In an embodiment, the controller 140 compares the partial first mode scan 123 to the first mode scan 112, to verify whether the second mode scan 122 covers the desired area of interest 154.

Based on the reliable co-registration between the first scanner 110, the second scanner 120, and the apparatus, the controller 140 is also configured to provide a fused scan as output. The fused scan incorporates and aligns information from the first mode scan 112 and the second mode scan 122. In an embodiment, the first mode scan 112 is obtained via transmission X-ray to generate a first image that serves as an initial image. The second mode scan 122 is obtained via X-ray diffraction to generate a second image that is aligned with and mapped onto the initial image. The controller 140 uses such mapping to generate the fused scan as an augmented image, whose appearance incorporates the second image. The controller 140 is configured to further augment the fused scan, e.g., by highlighting or coloring. For example, the fused scan is augmented to include the relatively smaller second image overlaid onto its corresponding area of interest 154 of the first image, highlighted in green to indicate an anomaly 152 that has been cleared as a permitted item. In another example, the first image corresponds to an X-ray image of an entire bag, and the second image corresponds to an X-ray diffraction pattern image of a pocket of the bag, overlain onto the pocket of the first image corresponding to an anomaly located inside the pocket.

In other embodiments, the controller 140 is configured to generate the fused scan by comparing and combining information from the first mode scan 112, the second mode scan 122, or the partial first mode scan 123. The controller 140 may determine average information for one or more pixels of the fused scan. For example, the average information can be based on summing information from the first mode scan 112 and corresponding other information from the partial first mode scan 123 and dividing the sum by two. In addition to information from the first mode scan 112 and the partial first mode scan 123, the controller 140 also may compare and use information from other scans, such as the second mode scan 122, to generate or augment the fused scan.

In some embodiments, the controller 140 is configured to provide an alert responsive to detecting a difference, between the first mode scan 112, the second mode scan 122, or the partial first mode scan 123. For example, the controller 140 determines a difference between information from the first mode scan 112 and corresponding other information from the partial first mode scan 123. The difference is compared to an alert threshold. The controller 140 provides an alert responsive to the difference exceeding the alert threshold. The alert indicates that there is a potential problem with the scanner or the item. For example, the alert indicates that the item shifted between performing the first and second scans, so the scans should be performed again. The alert can also indicate that there was a malfunction when obtaining the first scan or the second scan, providing a timely indication that a scanner should be serviced or replaced. Accordingly, such alerts ensure that non-alerting scans are accurate and reliable and minimizes the chances of obtaining unreliable scans.

The controller 140 also may use the alert to indicate that replacement scan information should be obtained, or to automatically perform a rescan. For example, the controller 140 may generate a replacement first scan, replacement second scan, or replacement partial first scan by applying a different processing algorithm to data obtained in the initial first scan, second scan, or partial first scan. Such an alternative algorithm approach is beneficial when the controller 140 identifies that, e.g., an adverse item has interfered with one type of scan information used to generate the initial scans, but which has not interfered with another type of scan information that was also already obtained. The controller can then use such already-obtained scan information to generate replacement scans when using a different algorithm. The controller 140 also may signal a need to obtain new scans, e.g., by re-scanning the item. For example, the controller 140 can identify that the item has shifted during scanning, or otherwise determine that the underlying issues with the scan information are not resolvable by application of another scanner or scan processing algorithm. In an embodiment, the controller 140 automatically conveys the item through the scanner again (e.g., using an actuatable belt), to obtain replacement scans. In another embodiment, the controller indicates that a new scan should be obtained, e.g., by providing an instruction dialog to an operator who can reposition the item to undergo scanning again.

In some embodiments, the controller 140 is configured to obscure at least one non-anomalous object on the fused scan, based on determining a difference between the first mode scan 112 and the second mode scan 122. Embodiments also are configured to obscure by averaging scan information from multiple scans. For example, the controller 140 uses the second mode scan 122 to determine that the anomaly 152, as detected in the first mode scan 112, is not an anomaly. Accordingly, in generating the fused scan, the controller 140 averages scan information to combine the information of the first mode scan 112 and the second mode scan 122. In an embodiment, the controller deems the information from the second mode scan 122 (including a partial first mode scan) to be more accurately sensed and rendered, compared to the first mode scan 112. The controller therefore deems the second mode scan 122, in such embodiments, to be a more accurate indication (compared to the first mode scan 112) of whether information is non-anomalous. Accordingly, the controller creates fused scans relatively cleaner than first mode scans by averaging out non-anomalies, and an operator or other staff member reviews the fused scan with a far lower likelihood of the presence of visual distractions (that would have been caused by non-anomalies, which are instead averaged out). Fused scans thereby mesh together scan data with other determination results from the controller 140, to provide image formats that are readily understood quickly and efficiently when visually presented to operators or other staff members performing visual reviews of the fused scans. Such results are provided by the output generator 168, which sends results to a local display or across network 102 to local server 104 or other destinations. The output generator 168 also provides alarm notifications or other alerts to indicate that an item has alarmed or is flagged for manual review.

In some embodiments, the controller 140 is configured to estimate whether scanning an item 150 would be more time-consuming and inefficient compared to manual screening. If so, the controller 140 saves time by flagging the item 150 for manual screening, bypassing further second mode scanning to save time. More specifically, the second scanner 120 performs a relatively more detailed and time-consuming scan (compared to the first scanner 110). When multiple anomalies are detected in need of second mode scans 122, the total scan time potentially exceeds the time for manual screening. Accordingly, embodiments enable the controller 140 to detect when total scan time, for a number of anomalies that were detected in the first mode scan 112, exceeds a threshold time corresponding to manual screening. A similar threshold condition will exist for areas of interest 154 that cover a sufficiently large area, independent of their total number. In an embodiment to check for the threshold condition, the anomaly detector 160 detects multiple anomalies in the first mode scan 112, and the area of interest identifier 162 determines multiple corresponding areas of interest and their sizes. The controller 140 then estimates a second mode scan time estimate, corresponding to an estimated time needed to obtain multiple second mode scans covering the areas of interest. If the second mode scan time estimate exceeds the allowable scan time threshold, the controller 140 terminates second mode scanning for the item 150, and flags it for manual screening. The scan time threshold is adjustable to accommodate varying factors at the checkpoint. In an embodiment, the scan time threshold is dynamically adjusted in view of current and expected airport traveler loads, which the controller 140 accesses via the network 102 (to access such load information on local server 104, remote server 106, or airline system 108).

In another embodiment, the apparatus 100 includes a single scanner, and does not include the first scanner 110 and the second scanner 120 (or other additional scanners). Accordingly, rather than transition between operation of multiple scanners, the embodiment uses one configurable scanner to obtain the first mode scan 112, and then the second mode scan 122 (or an arbitrary number of additional scans, such as those performed as part of an iterative scanning strategy). For example, the controller 140 configures the scanner to operate in a first mode to obtain the first mode scan 112 and reconfigures the scanner to operate in a second mode to obtain the second mode scan 122. In an embodiment, as part of a scanning procedure, the controller 140 selectively introduces one or more filters in a beam path of the scanner to reconfigure the scanner into multiple modes. In the case of an X-ray scanner, the scanner is configurable by selectively placing X-ray filters or diffraction gratings in the X-ray beam path, enabling the scanner to obtain different types of X-ray information and diffraction patterns corresponding to different scan modes.

In some embodiments, the apparatus 100 exchanges information over the network 102, to assist in scanning the items 150. For example, the anomaly detector 160 obtains updated item information, scanning information, passenger risk information, and so on from local server 104, remote server 106, or the airline system 108 (e.g., an airline reservation system). Such information enables the apparatus 100 to perform scanning more efficiently. For example, the apparatus 100 obtains updated checked baggage information from the airline system 108, indicating that an item 150 has a weight that is so light as to bear a reduced risk for the presence of explosives or weapons. Accordingly, the anomaly detector 160 and the automatic threat recognizer 166 adjust their detection thresholds or corresponding criteria used to determine whether an anomaly is a security risk. The controller 140 uses the detection thresholds to determine whether to classify an item as an anomaly, or whether to classify an anomaly as a known security risk such as a weapon or explosive. Similarly, updated passenger risk information is obtained from the remote server 106 (such as a public records database hosting criminal background information of individuals). The controller 140 uses the updated passenger risk information to indicate that the item 150 belongs to an individual having no criminal background, enabling the controller 140 to similarly adjust detection thresholds or criteria.

FIG. 2 is a depiction of an apparatus 200 including a first scanner 210 (formed by first emitter 214 and first sensor 216) configured to obtain a first mode scan 212 of the entire item 250 according to an embodiment. The apparatus 200 includes a belt 234 passing through an opening of the gantry 230. The apparatus 200 directs the belt 234 to selectively position the item 250 for scanning. For example, a controller of the apparatus 200 directs the belt 234 to convey the entirety of the item 250 through the opening to obtain a first mode scan 212, illustrated as an exploded view of multiple slices of the item 250. As illustrated, two slices include at least a portion of an anomaly 252. The apparatus 200 detects and identifies in the first mode scan 212 those two slices as being an area of interest (see area of interest 254 in FIG. 3). As explained in further detail below, the belt 234 re-conveys a portion of the item 250, corresponding to the area of interest 254, back through the opening in gantry 230, to obtain the second mode scan 222. The apparatus 200 also can direct the belt 234 to reconvey a portion of the item 250, or an entirety of the item 250, through the opening to obtain replacement scans, e.g., in response to alerting to an issue or problem with one or more scans. Similarly, the apparatus 200 also can iteratively direct the belt 234 to reconvey the item 250 past the scanner or scanners an arbitrary number of times. For example, such an approach may be used as part of an iterative strategy to obtain an arbitrary number of additional scans of the item 250. The additional scans may be performed according to a scanning strategy to further refine the characterization of the anomaly 252 and compare the characterization to a criterion. When the characterization matches the criterion to within a resolution threshold, the anomaly 252 is resolved as either a permitted item or a prohibited item. If the anomaly is not resolved, and the controller identifies that no viable procedures are available to further refine the characterization toward a criterion, the controller flags the anomaly for manual inspection.

Figure 3:
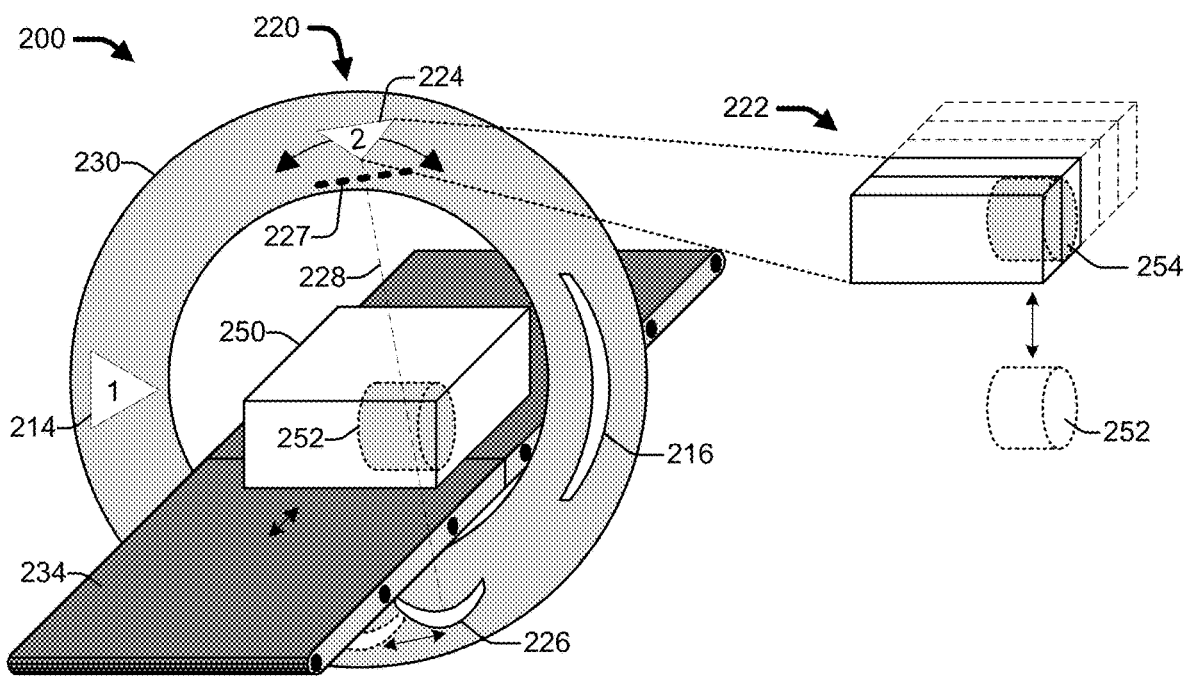
FIG. 3 is a depiction of the apparatus including a second scanner obtaining a second mode scan according to an embodiment.

The first emitter 214 is mounted to the gantry 230 and aligned with the axis of rotation of the gantry 230. The first emitter 214 is configured to operate at a relatively faster rotational speed of the gantry 230, compared to the second emitter 224. The second emitter 224 is represented in FIG. 3 by relatively smaller rotational arrows compared to those for the first emitter 214. The first emitter 214 operates in conjunction with the first sensor 216 to obtain the first mode scan 212. The first emitter 214 is configurable to emit different types of beams, such as planar or conical, and the first sensor 216 is compatible with receiving the different types of beams. In an embodiment, the first emitter 214 and the first sensor 216 are configurable to operate in a first mode and a second mode, to obtain the first mode scan 212 and the second mode scan 222, respectively. The second emitter 224 and the second sensor 226 are similarly configurable to operate in multiple modes. Accordingly, other embodiments may implement a single scanner (emitter and sensor pairing) to obtain an arbitrary number of scans, e.g., to perform an iterative scanning strategy using a single scanner apparatus. The illustrated embodiment of FIG. 2 obtains the first mode scan 212 by directing the belt 234 to progressively advance the entire item 250 through the scanners' beam paths, e.g., through the opening of the rotating gantry 230. The apparatus 200 thereby positions an entirety of the item 250 to be scanned by the first scanner and the second scanner mounted to the gantry. The apparatus 200 obtains the first mode scan 212 of an entirety of the item 250, including those portions of the item 250 containing an anomaly 252. The apparatus 200 detects the anomaly 252 (see anomaly detector 160 of FIG. 1), determines an area of interest 254 corresponding to the anomaly 252, and configures itself to obtain the second mode scan 222 pertaining to the anomaly 252.

FIG. 3 is a depiction of the apparatus 200 including a second scanner 220 (formed by second emitter 224 and second sensor 226) obtaining a second mode scan 222 according to an embodiment. The second mode scan 222 excludes various slices of the item 250, shown using dashed lines in FIG. 3. The second mode scan 222 excludes the various slices by focusing the second scanner 220 on those slices obtained by the first scanner 210 which pertain to the area of interest 254 of the anomaly 252. Furthermore, in embodiments, the second mode scan 222 further excludes portions of the slices containing the area of interest 254, to image the portion of the item 250 corresponding to the anomaly 252. More specifically, the second emitter 224 and the second sensor 226 of the second scanner 220 may be configured to obtain one or more scans off-axis. Such off-axis scans are obtained by the controller directing a scanner to orient according to an alignment that focuses on area of interest 254. Such alignment can be used to direct a scanner's beam at an anomaly or can be used to direct a scanner's beam away from an adverse portion of an item. Thus, a scan does not need to obtain a full slice that captures an entire cross-section of the item 250. Rather, the illustrated embodiment is capable of focusing on even smaller portions of the item 250, to exclude additional portions of a given slice. In other embodiments, the first scanner 210 and the second scanner 220 are based on tomographic imaging technology that obtains scans as full cross-sectional slices.

The apparatus 200 reconfigures from the first mode to the second mode by slowing a rotational speed of the gantry 230, directing the belt 234 to position the item 250 in a manner suitable for scanning according to a given mode. Once positioned, the apparatus selectively rotates the gantry 230 to focus on the area of interest 254. As illustrated in FIG. 3, the second scanner 220 changes its aim to focus on the anomaly 252, e.g., by positioning a beam path 228 (and repositioning the second sensor 226) of the second scanner 220 off-axis. Being aimed off-axis enables the second scanner 220 to trace a chord of the gantry 230, without passing through a center of the gantry 230, or a center of the item 250 as positioned. The focused beam path 228 enables the second emitter 224 to direct a relatively higher density of X-rays (or the equivalent scanning energy) on the area of interest 254, as compared to an unfocused beam path passing through a center of the gantry 230 (or otherwise perform scanning according to a different alignment). The re-alignment capabilities of the scanners enable the controller to choose a path through the item that minimizes exposure to adverse items, i.e., items that would adversely affect the beam, when scanning the area of interest. In other embodiments, item 250 may be positioned, moved or rotated to perform scans. The gantry may remain stationary as the item is positioned, moved or rotated for scanning. Embodiments of the disclosure are not limited to using belts for positioning.

Furthermore, the illustrated embodiment is configured in the second mode by interposing the X-ray diffraction grating 227 into the beam path 228. Various scanning technologies are compatible with the illustrated embodiment. The illustrated embodiment of apparatus 200 also is capable of fully stopping rotation of the gantry 230 and aiming or aligning the second scanner 220 independent of gantry rotation. The actuatable features of the second emitter 224 and the second sensor 226 of the second scanner 220 are usable in embodiments where the gantry is non-rotating, or where no gantry is used. Such actuatable features enable scanners to align for obtaining scans, or to direct a beam of the scanner to avoid adverse items.

The apparatus 200 is illustrated with two scanners, the first scanner 210 and the second scanner 220. The apparatus 200 selectively activates the first scanner 210 and the second scanner 220 to obtain the first mode scan 212 and the second mode scan 222, respectively. However, as mentioned above, the same scanner or equipment is configurable to obtain the first mode scan 212 or the second mode scan 222. Accordingly, embodiments are not limited to separate scanners mounted to the gantry 230 as illustrated. For example, in an embodiment, the apparatus 200 operates a given scanner (i.e., first scanner 210 or second scanner 220) with a first dwell time at a first power level according to the first mode. Apparatus 200 also operates the same scanner with a second dwell time at a second power level, to configure that scanner according to the second mode. In another embodiment, after the first scan mode, the apparatus 200 initiates a second mode scan 222 with the same sensor or group of sensors to obtain additional data related to accuracy, location or the like, e.g., by adjusting the scan rate with respect to the first scan rate utilized for the first mode scan 212. For other embodiments, the apparatus 200 activates a first scanning technology and inactivates a second scanning technology according to the first mode 212. Such technologies are housed in the same scanner, e.g., by activating first emitter or group of emitters and second emitter or group of emitters, or a first sensor or group of sensors and a second sensor or group of sensors in the same scanner. The apparatus 200 may similarly activate the second scanning technology of the scanner while inactivating the first scanning technology to configure the scanner according to the second mode.

Figure 4:
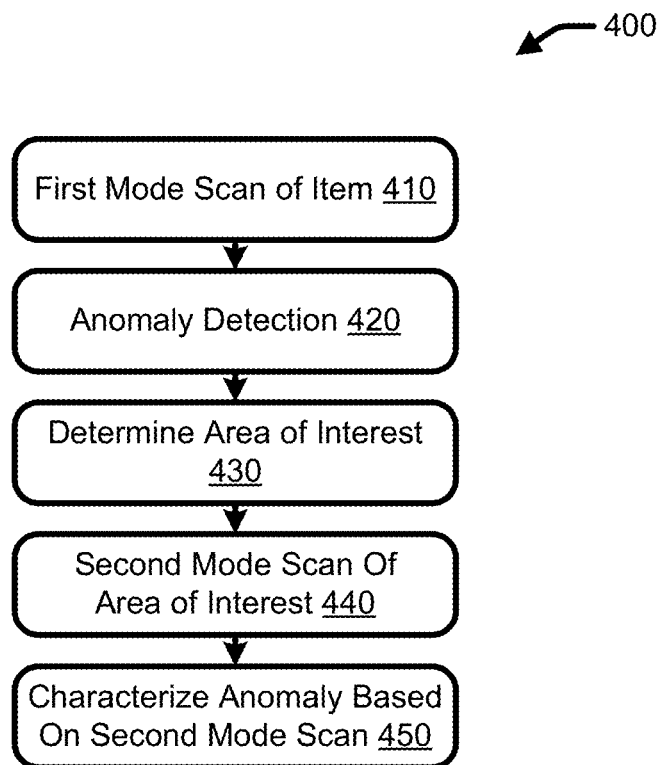
FIG. 4 is a depiction of a method to identify an anomaly based on a first mode scan and a second mode scan according to an embodiment.

FIG. 4 is a depiction of a method 400 to identify an anomaly based on a first mode scan and a second mode scan according to embodiments. The method 400 is used by an apparatus capable of obtaining a first mode scan and a second mode scan. In first mode scan 410, a scanner obtains a first mode scan of an item. For example, a first scanner uses transmissive X-ray scanning technology to obtain a tomographic first mode scan of an entirety of the item.

In anomaly detection 420, the apparatus detects whether the item contains an anomaly, based on the first mode scan. For example, a controller of the apparatus performs anomaly detection on the first mode scan to identify at least a portion of the first mode scan as being anomalous. Such anomaly detection is performed according to anomaly detection techniques, based on shape or density discrimination. The anomaly detection is capable of identifying multiple anomalies in a given item.

In area of interest determining 430, the apparatus determines an area of interest of the item corresponding to the detected anomaly. For example, the controller of the apparatus includes an area of interest identifier (sec, e.g., area of interest identifier 162 of embodiments disclosed in FIG. 1). The area of interest identifier uses the detected anomaly information, to extract location information of the item that pertains to the bounds of the anomaly. In an embodiment, the area of interest is determined as a three-dimensional outline of the detected anomaly. Various approaches are used to determine the area of interest, such as shape recognition, border detection, material discrimination, and other approaches. The controller maps the area of interest onto the item, to enable the apparatus to positively locate and focus on the area of interest when obtaining the second mode scan.

In second mode scan 440, the apparatus obtains a second mode scan of the area of interest. In an embodiment, the apparatus enables, independent of the first scanner (which is based on transmissive X-ray technology), a second scanner (which is based on phase contrast imaging) to obtain the second mode scan. The second scanner is aimed specifically at the area of interest, to focus on the anomaly and not focus on extraneous portions of the item that fall outside the boundary of the area of interest.

In anomaly characterization 450, the apparatus characterizes the anomaly based on the second mode scan. For example, the apparatus obtains the second mode scan in the form of a diffraction pattern characteristic of the area of interest corresponding to the anomaly. The apparatus accesses, via a network, a library of diffraction patterns stored on a local server. The apparatus compares the obtained diffraction pattern to the library and determines that the diffraction pattern is consistent with an explosive security risk. The apparatus then identifies the anomaly as a security risk (e.g., likely explosive) and outputs an indication that the anomaly is consistent with the explosive security risk. Although the method 400 is shown using a first mode scan and a second mode scan, other embodiments may use an arbitrary number of scan procedures, techniques, modes, or the like. For example, an embodiment may iteratively obtain an arbitrary number of scans.

Figure 5:
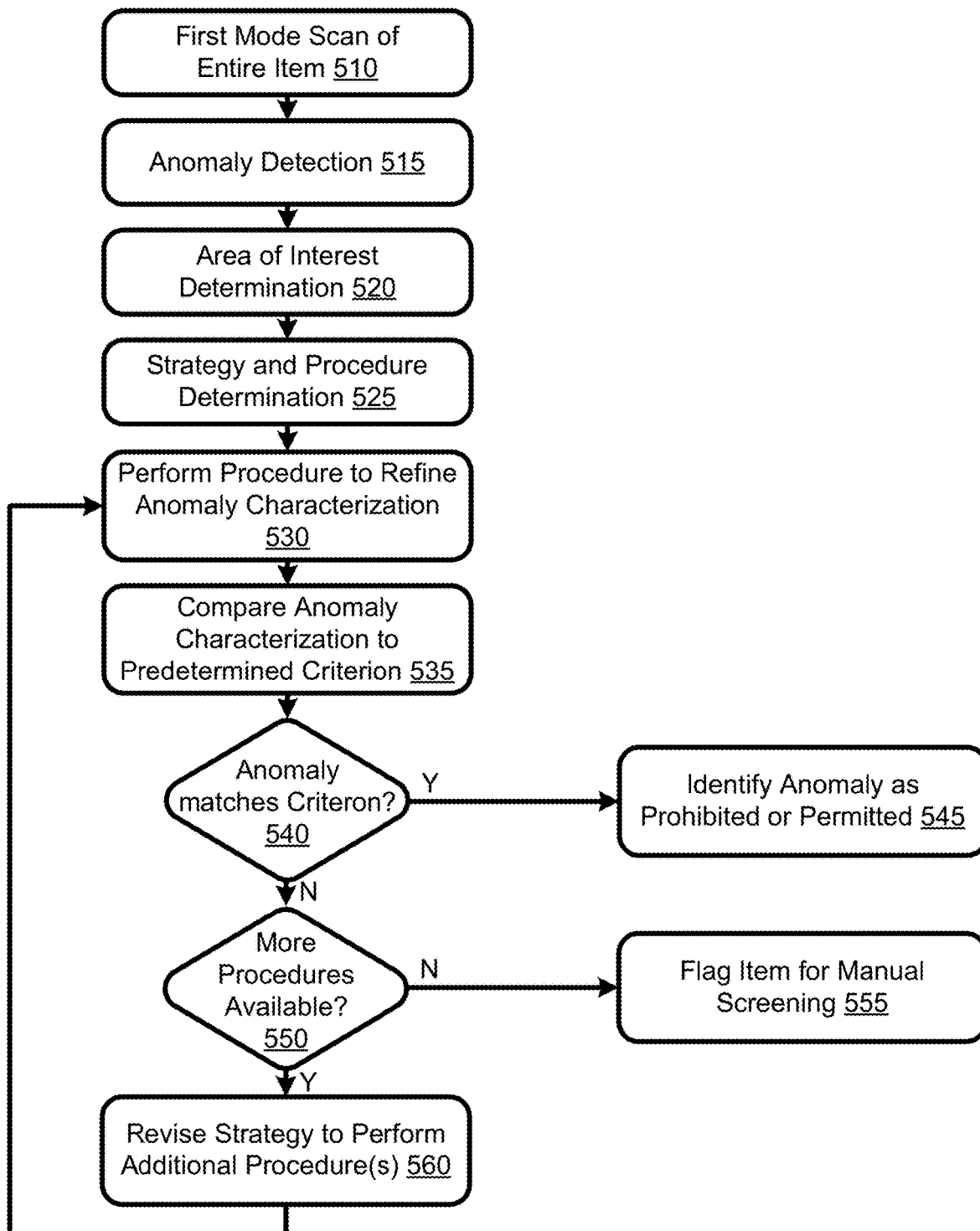
FIG. 5 is a depiction of a method to iteratively refine an anomaly characterization according to an embodiment.

FIG. 5 is a depiction of a method 500 to iteratively refine an anomaly characterization according to embodiments. In first mode scan 510, the method 500 obtains (e.g., by an emitter and a sensor of a scanner) information representing a first mode scan of an item. In an embodiment, the method obtains information for the entire item, based on a relatively quick scan procedure to obtain the information amenable to anomaly detection (e.g., based on transmissive X-ray scanning technology).

At anomaly detection 515, the method performs an anomaly detection procedure on the information, to determine whether the item contains an anomaly. In an embodiment, the anomaly detection procedure is based on shape or density discrimination.

At area of interest determination 520, the method determines (responsive to detecting the anomaly at anomaly detection 515) an area of interest of the item corresponding to a location of the anomaly. In an embodiment, a controller identifies information of the first mode scan corresponding to the area of interest.

At strategy and procedure determination 525, the method determines (e.g., based on the information corresponding to the area of interest), a strategy including a procedure to obtain other information of the area of interest. In an embodiment, the controller determines that the information from the area of interest is consistent with an explosive material. Accordingly, the controller forms a hypothesis that the material is likely explosive, and develops a strategy to deploy subsequent scan procedures to confirm whether the material is explosive. The controller also does not deploy some procedures that are not useful to evaluate potential explosives. The controller may selectively deploy such additional procedures iteratively, refining the strategy to deploy procedures as additional information is obtained (explained in further detail below).

At procedure performance 530, the method performs (as identified by the strategy and procedure determination) the procedure to obtain other information. In an embodiment, the other information is separate from the initially obtained information from the first mode scan. In another embodiment, the other information builds on the initially obtained information, or is otherwise derived from the initially obtained information. Such other information may be obtained by a controller applying an algorithm on at least a portion of the initially obtained information to derive the other information from the initially obtained information. The other information is used by the method to refine a characterization of the anomaly. For example, the other information may be vapor collected from the material, which further indicates the likelihood of explosive material.

At comparison 535, the method compares the characterization of the anomaly to a predetermined criterion. In an embodiment, the method uses, as the criterion, a predefined set of values corresponding to an explosive or other prohibited item. The method would, e.g., compare a density of the material to an explosive density, a vapor pressure of the material, and other values. If the values are within predefined acceptance thresholds, the method deems the criterion as being met. If the values are not within predefined acceptable thresholds, the method deems the criterion as not being met. The comparison 535 may perform many such comparisons, for multiple values and multiple different criteria of multiple different known permitted items or prohibited items. In an embodiment, the method accesses a library of known items associated with corresponding criteria, comparison values, and thresholds.

The method next proceeds to iteratively perform criterion checking and procedure availability checking, revising the strategy with each iteration until identifying the anomaly or flagging the item for manual screening.

At criterion check 540, the method checks whether a characterization of the anomaly meets the predetermined criterion. If yes, the method proceeds to anomaly identification 545.

At anomaly identification 545, the method identifies the anomaly as corresponding to a prohibited item, when the anomaly characterization matches a predetermined criterion for a prohibited item. The method identifies the anomaly as corresponding to a permitted item, when the anomaly characterization matches a predetermined criterion for a permitted item. The method may perform the matching to within a threshold, e.g., to an acceptable confidence level, within an acceptable percentage range, or the like. If, at the criterion check 540, the anomaly characterization does not match the criterion, the method proceeds to procedure availability check 550.

At procedure availability check 550, the method checks whether an additional scanning procedure to refine the characterization of the anomaly is available. In an embodiment, the method evaluates multiple aspects for the procedure availability check 550. One aspect is determining (e.g., by a controller) whether any scanning procedures remain available to be deployed. Another aspect is, even if a scanning procedure is available, whether that available scanning procedure would serve to further refine the characterization of the anomaly toward a criterion. The method may evaluate whether the procedure is more likely than not to further refine the anomaly characterization based on various information, such as the existing scanning strategy, information the method already knows about the anomaly, or what additional information the method should seek for helping to further identify the anomaly. In another embodiment, the method may check if any scanning procedure is available, and perform available procedures without needing to evaluate whether such candidate available procedures are likely to further refine the anomaly characterization. In yet another embodiment, the method performs additional available procedures until a predetermined time period is met. If no additional procedures are available, the method flags the item for manual screening at flagging 555. If additional procedures are available, the method proceeds to revision 560.

At revision 560, the method iteratively revises the strategy to perform the additional procedure and further refine the characterization of the anomaly, looping back to procedure performance 530 to perform another iteration.

Embodiments may perform various types of procedures as part of the strategy to resolve an anomaly. For example, the strategy including the procedure may include deriving other information about the anomaly, by performing further analysis of at least a portion of the information about the anomaly that has already been collected. An embodiment may selectively deploy computationally expensive algorithms to further analyze, e.g., a portion of information collected during an initial scan, corresponding to the area of interest. The strategy including the procedure may include adjusting how to perform a second mode scan to obtain other information about the anomaly. An embodiment may direct a scanner to use a longer dwell time, to integrate other scan information collected over time. Embodiments may perform such various types of procedures iteratively, e.g., according to the scanning strategy illustrated in FIG. 5.

Embodiments may evaluate whether a candidate procedure is more likely than not to further refine the anomaly characterization by considering results of prior successful procedures. In an embodiment, a controller accesses a library of anomalies and those respective procedures that successfully refined respective anomaly characterizations. Upon obtaining information about an anomaly, the controller compares that information to one or more previous scans and identifies a most similar previous scan. The controller accesses the library to determine the successful procedure associated with the most similar previous scan. The controller may revise a scanning strategy to adopt that successful procedure. That successful procedure has a likelihood to help refine the anomaly, due to the similarity between the information collected about the anomaly, and the information in the library corresponding to the most similar previous scan.

Figure 6:
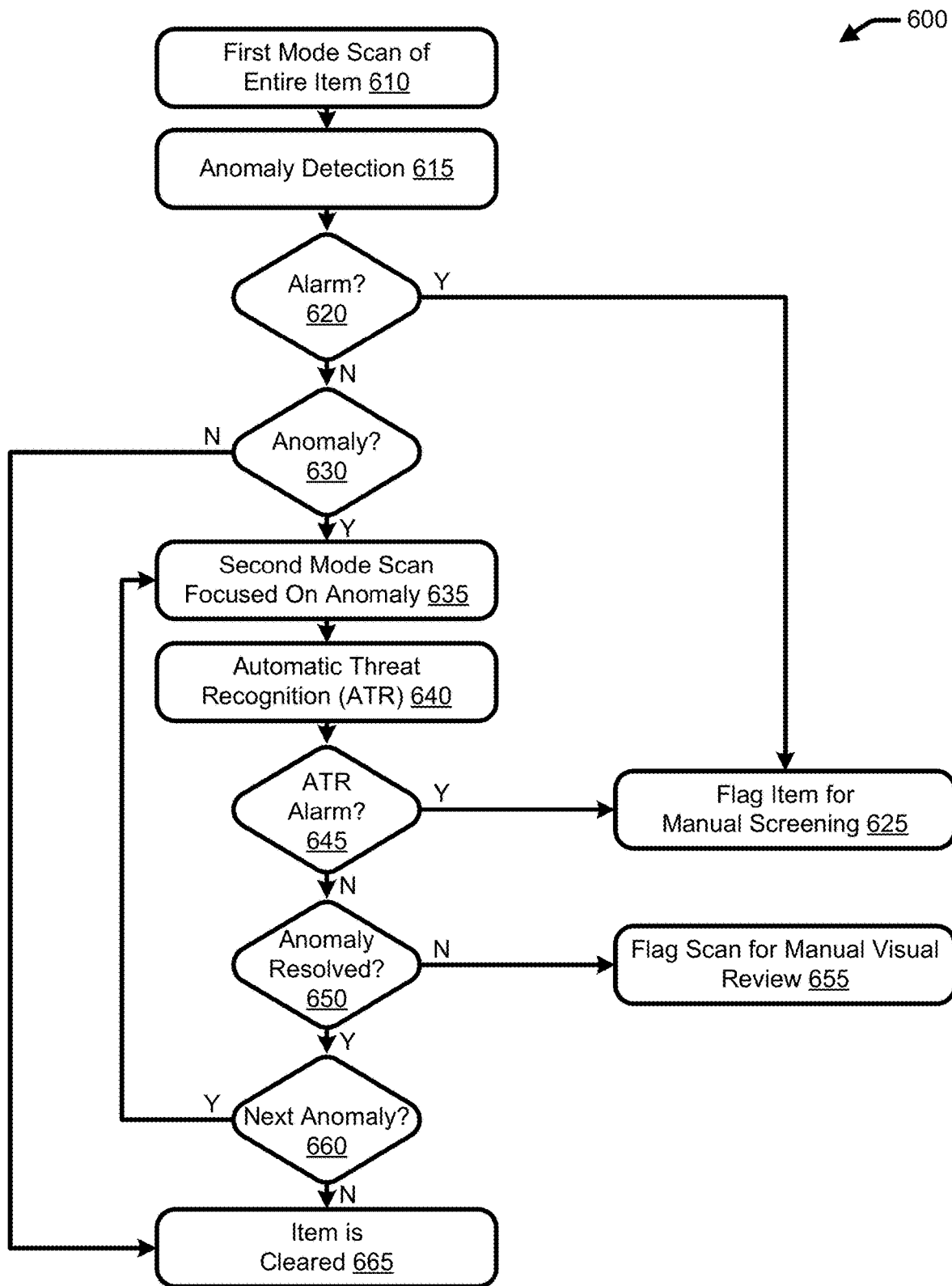
FIG. 6 is a depiction of a method to clear an item based on anomaly detection of a first mode scan and automatic threat recognition of a second mode scan according to an embodiment.

FIG. 6 is a depiction of a method 600 to clear an item based on anomaly detection of a first mode scan and automatic threat recognition of a second mode scan according to an embodiment. The method 600 is used by an apparatus capable of obtaining a first mode scan and a second mode scan. In first mode scan 610, the apparatus obtains a first mode scan of the entire item. For example, the apparatus accepts a bag item onto a belt that passes through an opening of a rotating gantry. A first scanner is mounted to the rotating gantry. A controller of the apparatus directs the first scanner to obtain the first mode scan based on transmissive X-ray tomography. The first mode scan involves the controller directing the gantry to rotate at 200 RPMs. During rotation, an emitter of the first scanner directs a beam of X-rays through an axis of rotation of the gantry, according to an alignment instruction from the controller. Also during rotation, the controller directs the belt to advance the item through the gantry while passing along the axis of rotation.

At anomaly detection 615, the apparatus performs anomaly detection on the first mode scan. For example, the apparatus includes a processor configured to apply a locally-stored anomaly detection algorithm to the electronic information that represents the first mode scan. In another embodiment, the apparatus includes a communication unit in network communication with a server. The communication unit is configured to transmit the electronic information representing the first mode scan to the remote server. The communication unit also is configured to receive anomaly detection results from the server, and pass the anomaly detection results to the local processor of the apparatus.

At alarm check 620, the apparatus determines whether to generate an anomaly detection alarm corresponding to a possible known security risk item, based on the results of the anomaly detection. For example, the apparatus detects an anomaly and determines, based on the first mode scan, that the anomaly is consistent with a threat without needing to perform a second mode scan for further differentiation. If the anomaly detection generates an alarm, the process flow proceeds to flagging 625. In flagging 625, the item being scanned is flagged for manual screening to assess the possible security risk, e.g., a known security risk. For example, the apparatus generates an alarm for detecting a potential razor blade security risk contained in a bag item. The apparatus alerts the screening agent to pull the bag item out of the apparatus, to manually review the item and locate the potential razor blade. If, at alarm check 620 the apparatus determines not to generate an anomaly detection alarm, flow proceeds to anomaly check 630.

At anomaly check 630, the apparatus determines whether an anomaly is detected as a result of the anomaly detection. If the anomaly detection does not detect any anomalies, the process flow proceeds to item clearance 665. In item clearance 665, the apparatus clears the item undergoing scanning, terminating further scanning of the item and passing the item out of the apparatus. If, at anomaly check 630 the apparatus detects at least one anomaly, flow proceeds to second mode scan 635.

At second mode scan 635, the apparatus obtains a second mode scan focused on the anomaly, as detected in the first mode scan. In an embodiment, the apparatus positions a second sensor to obtain the second mode scan, e.g., corresponding to an alignment of a beam used by the scanner. The controller can determine the alignment to minimize exposure to adverse beam effects. The second sensor is different than a first sensor used to obtain the first scan mode. Various approaches are used by the apparatus to obtain the second mode scan. In embodiments, the second mode scan is obtained by operating the scanner according to a different mode, by activating a different scan beam path or alignment, by activating a different scanner of the apparatus, by inserting a filter or other interference in the scan beam path, or by various other techniques described herein. Obtaining the second mode scan also involves the apparatus receiving location information corresponding to an area of interest of the anomaly, alignment information regarding avoidance of adverse beam effects, and positioning the item in order to enable the apparatus to focus scans on that area of interest. In an embodiment, the apparatus uses shape detection on the results of the anomaly detection, and correlates the detected shape to a location in the item. The location corresponds to the area of interest. The controller then directs a belt to move the item until the area of interest aligns with obtaining the second mode scan. The controller begins obtaining the second mode scan, while advancing the belt until the area of interest is imaged. This process of obtaining the second mode scan is repeated for each detected anomaly and its corresponding area of interest (see discussion below with respect to processing multiple anomalies via next anomaly check 660).

At automatic threat recognition (ATR) 640, the apparatus performs a modified version of ATR on electronic information representing the second mode scan. For example, the apparatus includes a processor configured to apply a locally-stored modified ATR algorithm to the electronic information representing the second mode scan. In another embodiment, the apparatus includes a communication unit in network communication with a server and configured to transmit the electronic information, representing the second mode scan, to the server that is configured to perform the modified ATR algorithm. The communication unit is also configured to receive ATR results from the server, and pass the ATR results to the local processor of the apparatus. In an embodiment, the modified ATR algorithm incorporates information from the first mode scan, such as a general shape of the item, and relative location of the anomaly within the item, or other information. Additionally, the modified ATR algorithm incorporates results of the anomaly detection that was performed on the first mode scan. The modified ATR algorithm uses the second mode scan information to determine whether the shape, material, or other information of the area of interest are consistent with any known security risk items, or any known permitted items (e.g., by accessing a database of known items and their properties).

The modified ATR algorithm generates an alarm if the area of interest is consistent with a known security risk. The modified ATR algorithm resolves the anomaly if the area of interest is consistent with a known permitted item. Thus, if the modified ATR algorithm generates an alarm at alarm check 645, flow proceeds to flagging 625 and the item is flagged for manual screening as described above. If no alarm at alarm check 645, flow proceeds to resolution check 650. If the modified ATR algorithm failed to resolve the anomaly at resolution check 650, flow proceeds to flagging 655 and the scan(s) of the item are flagged for manual visual review. In an embodiment, flagging for manual visual review involves the apparatus visually fusing results of the first mode scan and the second mode scan. The apparatus presents the fused results as an image to an agent for visual review, e.g., via a user interface or other display. If the anomaly is resolved at resolution check 650, flow proceeds to next anomaly check 660.

At next anomaly check 660, as referenced above, the apparatus checks whether multiple anomalies were detected in the item that is being processed as described above. If so, flow loops back to second mode scan 635, and the next anomaly is scanned in detail to obtain a second mode scan of the next anomaly. This approach is repeated until remaining anomalies have been processed. If, at next anomaly check 660, no anomalies remain for processing, flow ends at item clearance 665 by clearing the item to proceed out of the apparatus.

Certain attributes, functions, steps of methods, or sub-steps of methods described herein are associated with physical structures or components, such as a module of a physical device, that in implementations in accordance with this disclosure make use of instructions (e.g., computer executable instructions) that are embodied in hardware, such as an application specific integrated circuit, computer-readable instructions that cause a computer (e.g., a general-purpose computer) executing the instructions to have defined characteristics, a combination of hardware and software such as processor implementing firmware, software, and so forth such as to function as a special purpose computer with the ascribed characteristics.

In some embodiments a module comprises a functional hardware unit (such as a self-contained hardware or software or a combination thereof) designed to interface with the other components of a system, such as through use of an Application Programming Interface (API). In embodiments, a module is structured to perform a function or set of functions, such as in accordance with a described algorithm. To the extent this disclosure implements nomenclature that associates a particular component or module with a function, purpose, step or sub-step, such nomenclature is also used to identify the structure, which in instances includes hardware or software that function for a specific purpose.

Although the subject matter has been described in language specific to structural features or methodological steps, it is to be understood that the subject matter defined in the appended claims is not necessarily limited to the specific features or steps described. Rather, the specific features and steps are disclosed as example forms of implementing the claimed subject matter. Although headings are used for the convenience of the reader, these are not to be taken as limiting or restricting the systems, techniques, approaches, methods, or devices to those appearing in any section. Rather, the teachings and disclosures herein can be combined or rearranged with other portions of this disclosure. It is the intention of this disclosure to encompass and include such variation.

What is claimed is:

1. A method to characterize an anomaly, comprising:
    obtaining information about an item using a first mode scan;
    detecting whether the item contains an anomaly based on the information;
    determining, responsive to detecting the anomaly, an area of interest of the item corresponding to a location of the anomaly;
    determining, based on the information, a strategy including a procedure to obtain other information of the area of interest;
    performing the procedure to refine a characterization of the anomaly based on the other information;
    comparing the characterization of the anomaly to a predetermined criterion;
    when the characterization of the anomaly does not meet the predetermined criterion and an additional procedure to refine the characterization of the anomaly is available, iteratively revising the strategy to perform the additional procedure and further refine the characterization of the anomaly;
    when the characterization of the anomaly does not meet the predetermined criterion and no additional procedures to refine the characterization of the anomaly are available, flagging the item to indicate another method is needed to characterize the anomaly;
    when the characterization of the anomaly meets the predetermined criterion corresponding to a prohibited item, identifying the anomaly as prohibited;
    detecting a plurality of anomalies based on the first mode scan of the item;
    determining a plurality of areas of interest corresponding to the plurality of anomalies;
    determining, according to the strategy, a second mode scan time estimate corresponding to obtaining a plurality of second mode scans of the plurality of areas of interest;
    determining, according to the strategy, whether the second mode scan time estimate exceeds a scan time threshold; and
    when the second mode scan time estimate exceeds the scan time threshold, terminating, according to the strategy, second mode scans of the item and flagging the item for manual screening.

2. The method of claim 1, further comprising, when the characterization of the anomaly meets the predetermined criterion corresponding to a permitted item, identifying the anomaly as not being a security risk.

3. The method of claim 1, wherein the strategy including the procedure comprises deriving the other information by performing further analysis of the information.

4. The method of claim 1, wherein the strategy including the procedure comprises adjusting how to perform a second mode scan to obtain the other information.

5. The method of claim 1, wherein the strategy including the procedure comprises:
    comparing the information to one or more previous scans associated with respective one or more previous successful procedures;
    identifying a most similar previous scan, associated with a respective most similar previous successful procedure, from among the one or more previous scans; and
    when the most similar previous successful procedure is available, revising the strategy to adopt the most similar previous successful procedure to refine the characterization of the anomaly.

6. The method of claim 1, further comprising obtaining the information using an emitter and a sensor of a scanner.

7. The method of claim 1, further comprising flagging the item to indicate that manual screening is needed to characterize the anomaly.

8. A method to characterize an anomaly, comprising:
    obtaining, by a scanner, information representing a first mode scan of an item;
    detecting whether the item contains an anomaly based on the information representing the first mode scan;
    determining an area of interest of the item corresponding to a location of the anomaly, responsive to detecting the anomaly;

determining a strategy to obtain other information relevant to characterizing the anomaly;
interposing, according to the strategy, at least one diffraction grating in a beam path of the scanner that was used to obtain the information representing the first mode scan;
obtaining, by the scanner according to the strategy, other information representing a second mode scan of the area of interest while using the at least one diffraction grating, the second mode scan being a phase contrast scan;
characterizing the anomaly based on the second mode scan;
differentiating whether the anomaly constitutes a security risk based on comparing an anomaly characteristic to a predetermined criterion;
detecting a plurality of anomalies based on the first mode scan of the item;
determining a plurality of areas of interest corresponding to the plurality of anomalies;
determining, according to the strategy, a second mode scan time estimate corresponding to obtaining a plurality of second mode scans of the plurality of areas of interest;
determining, according to the strategy, whether the second mode scan time estimate exceeds a scan time threshold; and
when the second mode scan time estimate exceeds the scan time threshold, terminating, according to the strategy, second mode scans of the item and flagging the item for manual screening.

9. The method of claim 8, further comprising, while obtaining the second mode scan of the area of interest using the at least one diffraction grating according to the strategy, obtaining a partial first mode scan of the area of interest that is subject to the second mode scan.

10. The method of claim 9, further comprising:
matching the partial first mode scan to a corresponding portion of the first mode scan;
verifying alignment of the second mode scan relative to the first mode scan based on the matching; and
verifying that the second mode scan corresponds to the area of interest based on the matching.

11. The method of claim 9, further comprising:
comparing the partial first mode scan to a corresponding portion of the first mode scan to determine an offset;
registering alignment between the first mode scan and the second mode scan according to the offset; and
aiming the second mode scan by accounting for the offset relative to results from the first mode scan.

12. The method of claim 9, further comprising the first mode scan and the partial first mode scan being formed of first scan information, and the second mode scan being formed of second scan information that is orthogonal to the first scan information.

13. The method of claim 9, further comprising:
comparing information from the first mode scan with corresponding partial first information from the partial first mode scan;
determining whether there is difference information, representing a difference between the information and the partial first information;
comparing the difference information to an alert threshold; and
generating an alert responsive to the difference information exceeding the alert threshold.

14. The method of claim 13, further comprising:
comparing the difference information to a rescan threshold; and
obtaining a replacement scan, responsive to the difference information exceeding the rescan threshold, the replacement scan being based on at least one of a different scan mode or different scan processing algorithm.

15. The method of claim 8, further comprising removing at least one diffraction grating from the beam path to configure the scanner according to the strategy.

16. The method of claim 8, further comprising operating the scanner with a first dwell time at a first power level to obtain the first mode scan, and operating the scanner with a second dwell time at a second power level according to the strategy to obtain the second mode scan.

17. The method of claim 8, further comprising:
fusing the first mode scan with the second mode scan to produce a fused scan; and
characterizing the anomaly based on the fused scan.

18. An apparatus comprising:
a mechanism configured to convey an item to be scanned;
a scanner configured to:
operate in a first mode to obtain information representing a first mode scan of the item, the information usable by a controller to detect whether the item contains an anomaly and determine an area of interest of the item corresponding to the anomaly;
determine, by the controller, a strategy to obtain other information relevant to characterizing the anomaly; and
operate according to the strategy in a second mode to obtain, responsive to the anomaly being detected in the first mode scan, the other information representing a second mode scan of the area of interest of the item, the other information usable by the controller to characterize the anomaly;
the controller being configured to fuse the information with the other information to further characterize the anomaly and differentiate whether the anomaly constitutes a security risk based on a predetermined criterion; and
the controller being further configured to:
detect a plurality of anomalies based on the first mode scan of the item;
determine a plurality of areas of interest corresponding to the plurality of anomalies;
determine, according to the strategy, a second mode scan time estimate corresponding to obtaining a plurality of second mode scans of the plurality of areas of interest;
determine, according to the strategy, whether the second mode scan time estimate exceeds a scan time threshold; and
when the second mode scan time estimate exceeds the scan time threshold, terminate, according to the strategy, second mode scans of the item and flag the item for manual screening.

19. An apparatus comprising:
a first scanner mounted to a gantry and configured to obtain a first mode scan of an item, the first scanner including an emitter and a sensor configured to enable the first scanner to scan the item and generate an electronic signal corresponding to information representing the first mode scan;
a controller configured to:
detect, in the information representing the first mode scan, whether the item contains an anomaly, determine an area of interest of the item corresponding to a location of the anomaly, and determine, based on the first mode scan, a strategy to obtain other information relevant to characterizing the anomaly and representing a second mode scan of the area of interest; and a second scanner mounted to the gantry and configured to be operated by the controller according to the strategy to obtain the second mode scan of the area of interest under direction of the controller, the second scanner including an emitter and a sensor configured to enable the second scanner to scan the item and generate an other electronic signal corresponding to other information representing the second mode scan, responsive to the controller detecting the anomaly in the information representing the first mode scan;

the controller being configured to characterize the anomaly based on the other information from the second mode scan obtained according to the strategy, and differentiate whether the anomaly constitutes a security risk based on comparing the other information to a predetermined criterion; and the controller being further configured to:

detect a plurality of anomalies based on the first mode scan of the item;

determine a plurality of areas of interest corresponding to the plurality of anomalies;

determine, according to the strategy, a second mode scan time estimate corresponding to obtaining a plurality of second mode scans of the plurality of areas of interest;

determine, according to the strategy, whether the second mode scan time estimate exceeds a scan time threshold; and when the second mode scan time estimate exceeds the scan time threshold, terminate, according to the strategy, second mode scans of the item and flag the item for manual screening.

20. The apparatus of claim 19, wherein the strategy comprises determining an alignment of the second scanner to obtain the other information to minimize adverse impacts to properties of the other information.

21. The apparatus of claim 19, wherein the controller is configured to fuse the information from the first mode scan and the other information from the second mode scan to characterize the anomaly.

22. The apparatus of claim 19, further comprising a belt, the controller being configured to direct the belt to convey an entirety of the item past the emitter and the sensor of the first scanner to obtain the first mode scan, and to direct the belt according to the strategy to convey a portion of the item, corresponding to the area of interest, past the emitter and the sensor of the second scanner to obtain the second mode scan.

23. The apparatus of claim 19, further comprising the controller being configured to direct the gantry to rotate the first scanner at a first revolutions per minute (RPM) to obtain the first mode scan, and rotate the second scanner according to the strategy at a second RPM lower than the first RPM to obtain the second mode scan.

24. The apparatus of claim 19, further comprising the controller being configured to direct the gantry to rotate the first scanner through a plurality of revolutions to obtain the first mode scan, and rotate the second scanner according to the strategy through less than one revolution to obtain the second mode scan.

25. The apparatus of claim 19, further comprising the controller being configured to reorient an aim of the second scanner according to the strategy, to aim the second scanner off-axis in an alignment toward the area of interest.

26. The apparatus of claim 25, further comprising the controller being configured to reorient the aim of the second scanner according to the strategy by directing the second scanner to reposition at least one of the emitter or the sensor consistent with the alignment to obtain the second mode scan off-axis.

27. The apparatus of claim 19, further comprising the controller being configured to perform anomaly detection on the information representing the first mode scan to detect the anomaly, and automatic threat recognition on the other information representing the second mode scan to identify at least one characteristic of the anomaly to characterize and differentiate the anomaly.

28. The apparatus of claim 19, further comprising the first scanner being a transmission X-ray scanner, and the second scanner being at least one of a phase contrast interference imaging scanner or an X-ray diffraction scanner.

* * * * *